United States Patent
Tanaka

(10) Patent No.: US 8,363,304 B2
(45) Date of Patent: Jan. 29, 2013

(54) ELECTROPHORETIC DISPLAY DEVICE AND METHOD OF FABRICATING THE SAME

(75) Inventor: Hiromitsu Tanaka, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 1493 days.

(21) Appl. No.: 11/892,943

(22) Filed: Aug. 28, 2007

(65) Prior Publication Data

US 2008/0055235 A1    Mar. 6, 2008

(30) Foreign Application Priority Data

Aug. 30, 2006    (JP) ................. 2006-234471

(51) Int. Cl.
G02B 26/00    (2006.01)

(52) U.S. Cl. .................. 359/296; 359/245; 359/253

(58) Field of Classification Search .............. 359/296, 359/245, 253, 254, 290, 291
See application file for complete search history.

(56) References Cited

U.S. PATENT DOCUMENTS

| | | | |
|---|---|---|---|
| 2004/0155857 A1* | 8/2004 | Duthaler et al. | 345/107 |
| 2006/0291034 A1* | 12/2006 | Patry et al. | 359/296 |
| 2007/0177248 A1* | 8/2007 | Kanbayashi | 359/296 |
| 2008/0252962 A1 | 10/2008 | Makubo et al. | |

FOREIGN PATENT DOCUMENTS

| | | |
|---|---|---|
| JP | 2005-114820 | 4/2005 |
| JP | 2005-309075 | 11/2005 |
| JP | 2006-154513 | 6/2006 |

OTHER PUBLICATIONS

Chinese Office Action dated Jan. 29, 2010 with English translation thereof.

* cited by examiner

*Primary Examiner* — James Jones
(74) *Attorney, Agent, or Firm* — McGinn IP Law Group, PLLC

(57) ABSTRACT

In fabrication of an electrophoretic display device, a display defect (blotches or smears on the display screen) caused by the fact that a very small quantity of moisture and/or air bubbles existing near the electrophoretic display element layer enter the inside of the layer, and another display defect (defective driving) caused by the fact that the said moisture and/or air bubbles enter the boundary between the first substrate and the layer, are reliably prevented. The display element layer is fixed on the display region of the TFT substrate, the sealing member is formed on the TFT substrate to surround the display element layer, and the glass substrate is fixed to the sealing member, constituting the closed inner space around the layer. The space is filled with an inert gas having a pressure approximately equal to an atmospheric pressure or set in a predetermined vacuum state.

4 Claims, 27 Drawing Sheets

(FIRST EMBODIMENT)

TFT SUBSTRATE
— 101

— 102
ELECTROPHORETIC
BISTABLE DISPLAY
ELEMENT LAYER

102

101

103
ADHESIVE

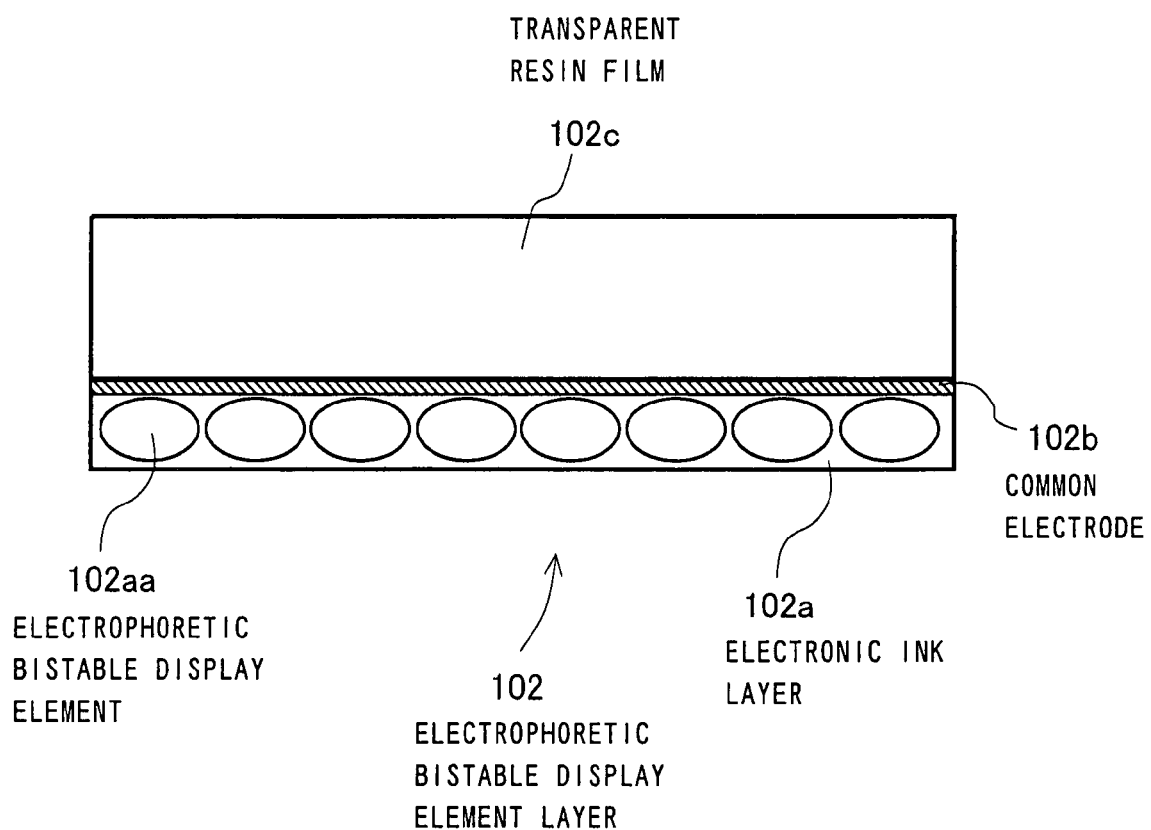

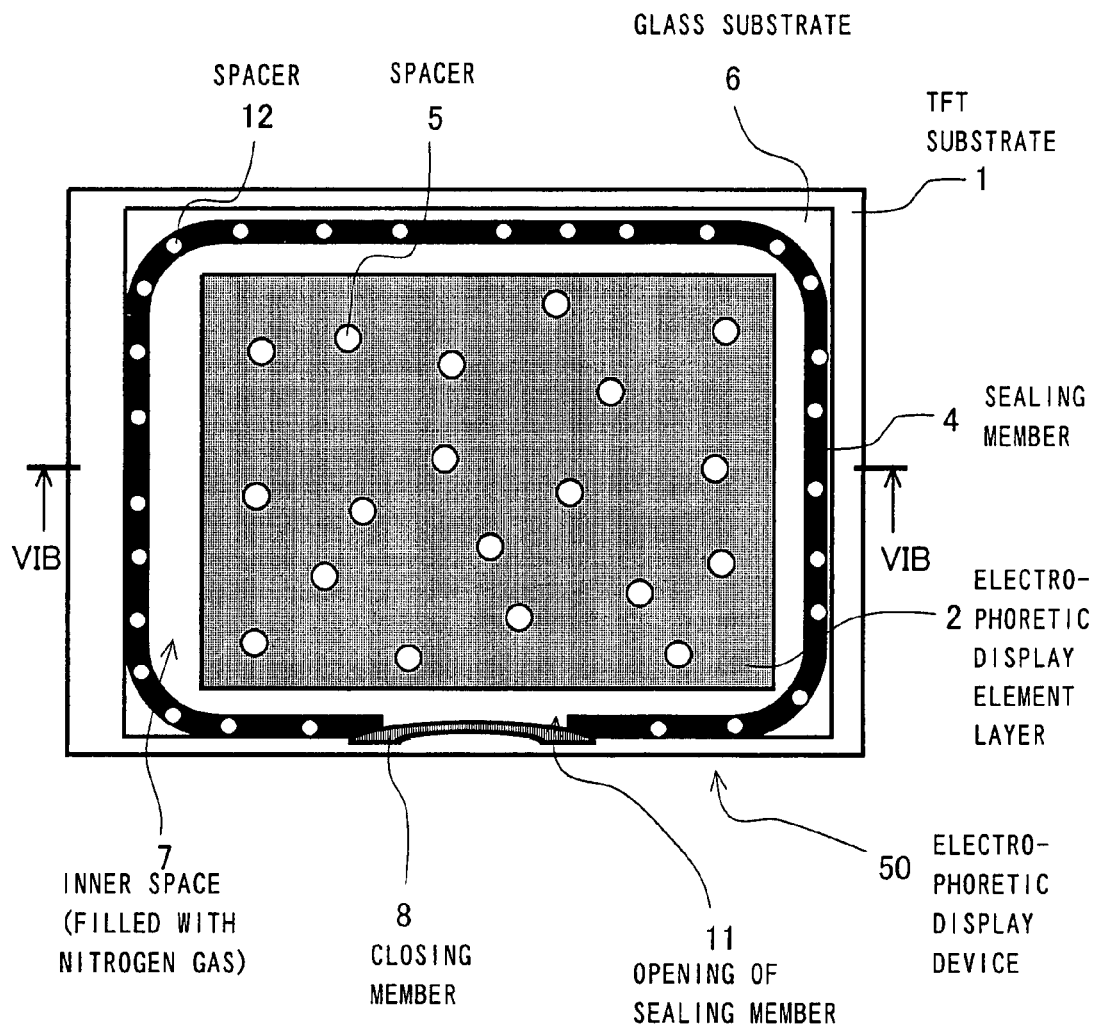
FIG. 6A (FIRST EMBODIMENT)
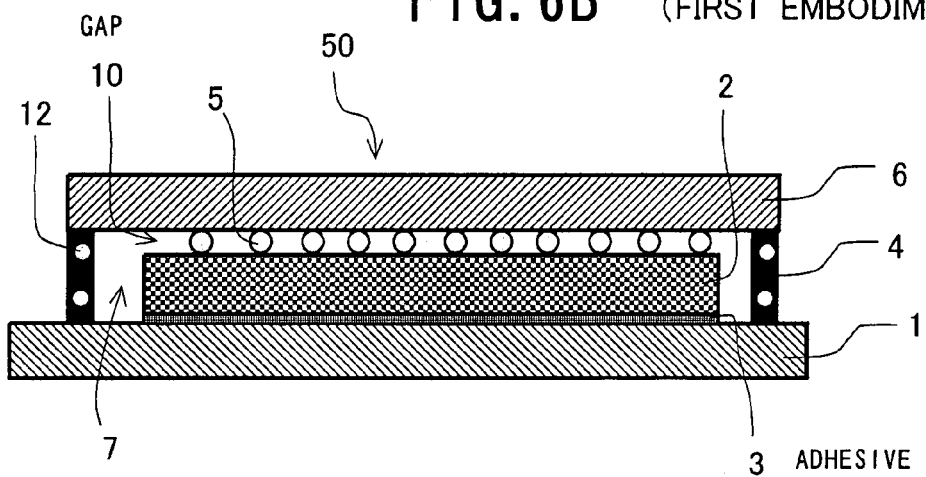
FIG. 6B (FIRST EMBODIMENT)

FIG. 7A (FIRST EMBODIMENT)
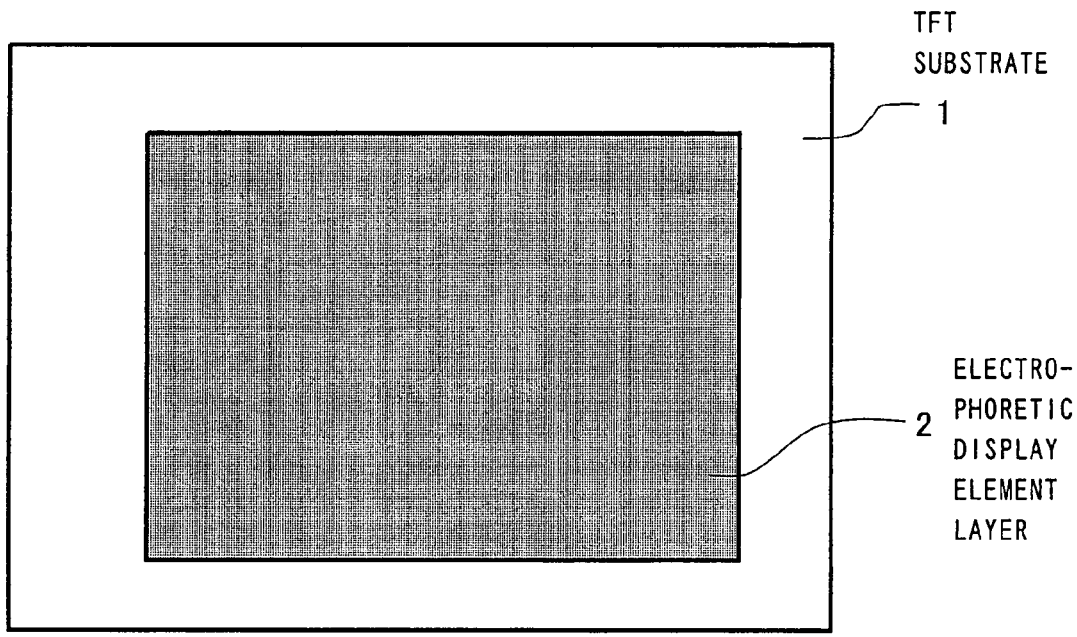
FIG. 7B (FIRST EMBODIMENT)
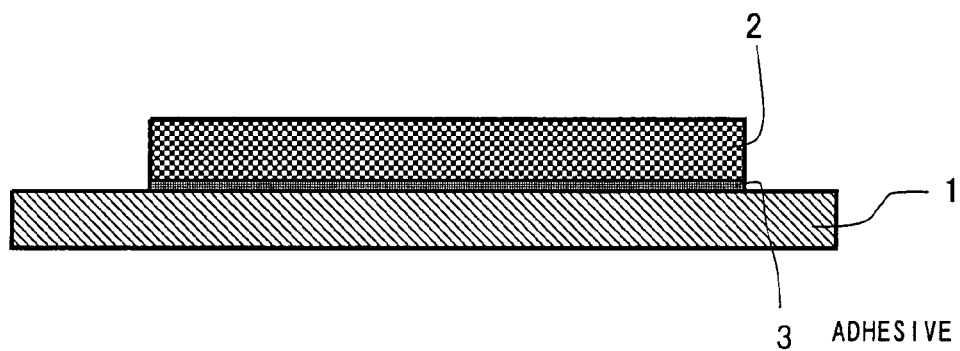

FIG. 8A (FIRST EMBODIMENT)
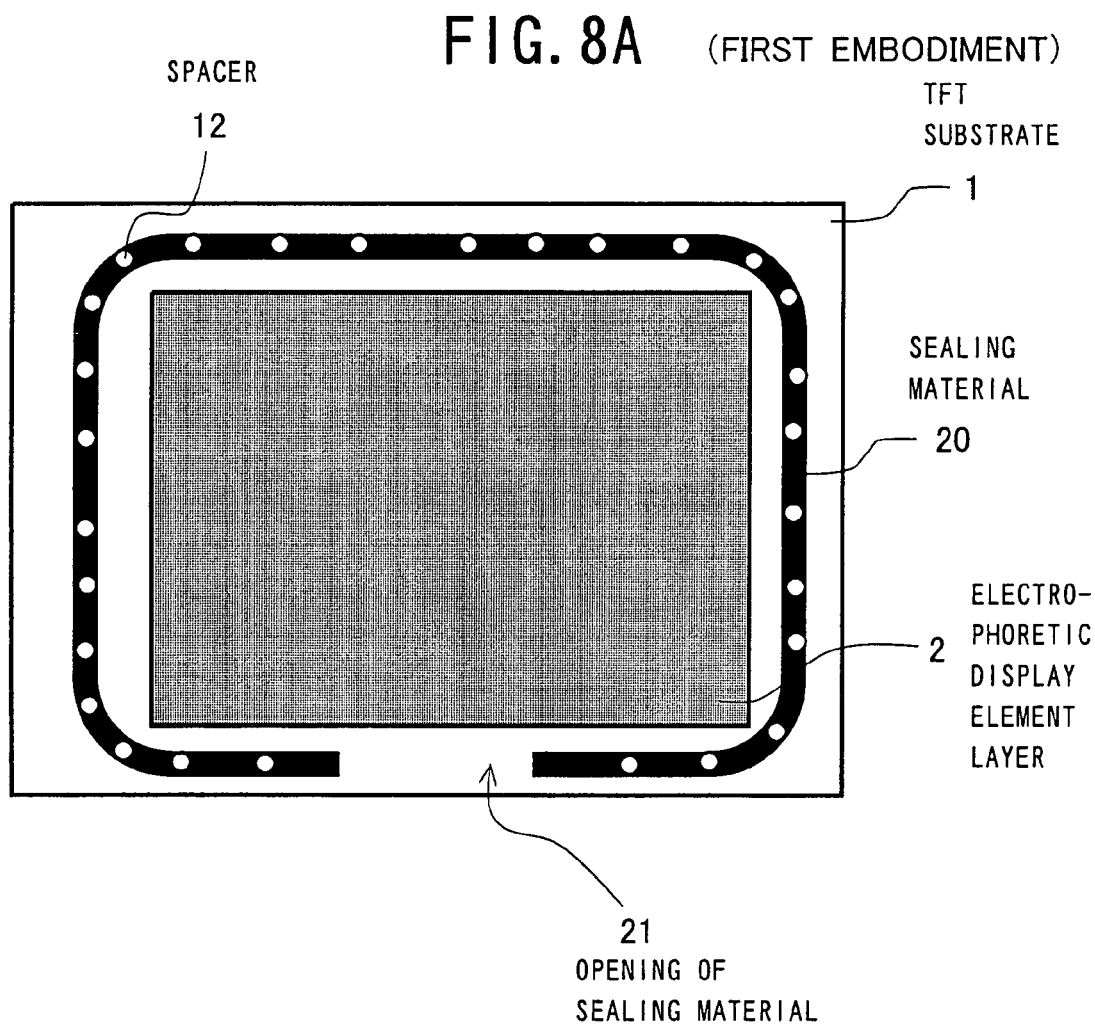
FIG. 8B (FIRST EMBODIMENT)
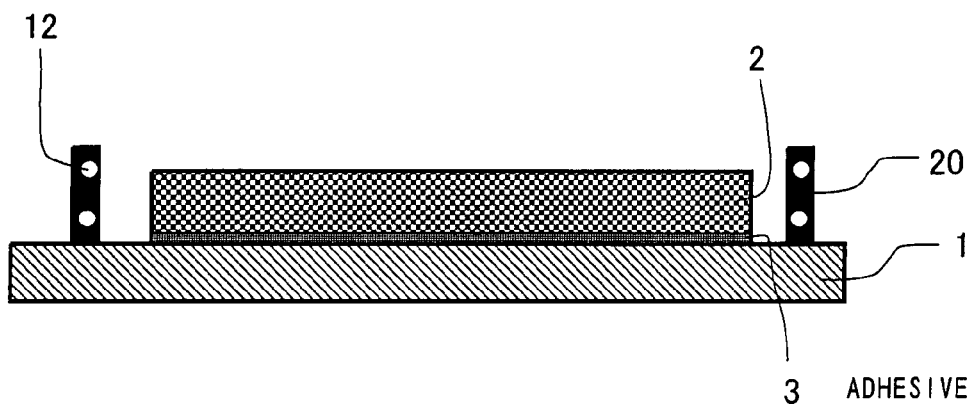

FIG. 9A (FIRST EMBODIMENT)
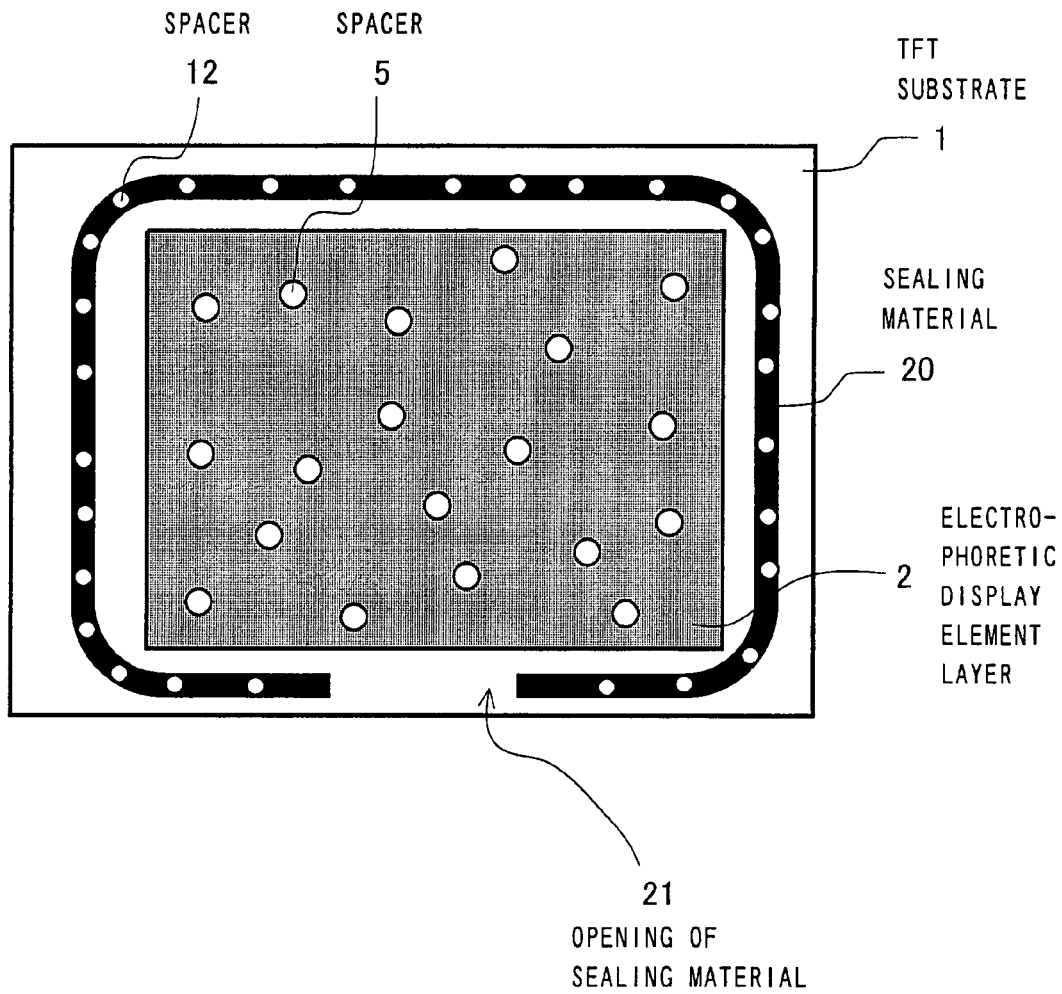
FIG. 9B (FIRST EMBODIMENT)
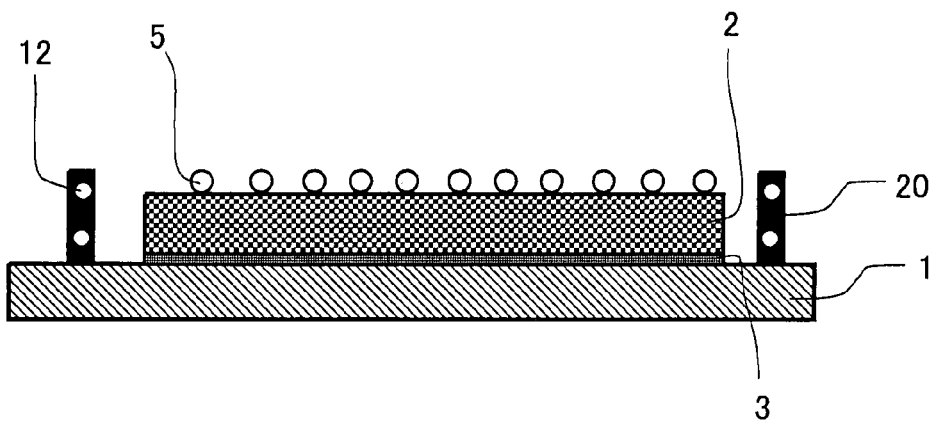

FIG. 10A (FIRST EMBODIMENT)
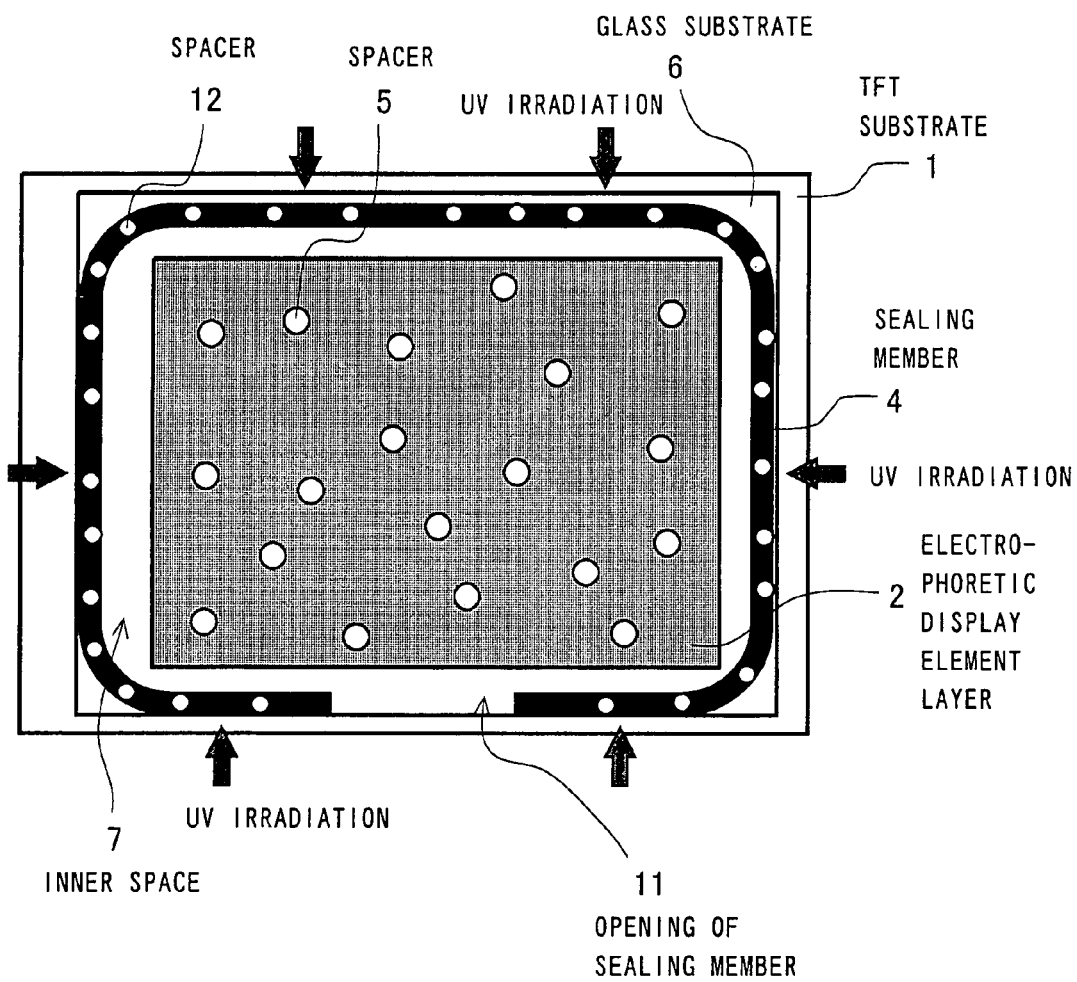
FIG. 10B (FIRST EMBODIMENT)
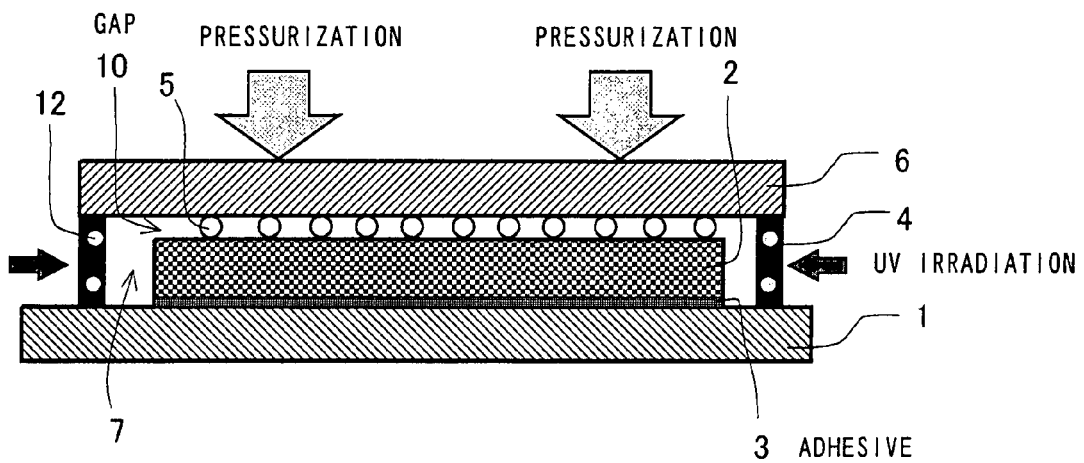

FIG. 11A (FIRST EMBODIMENT)
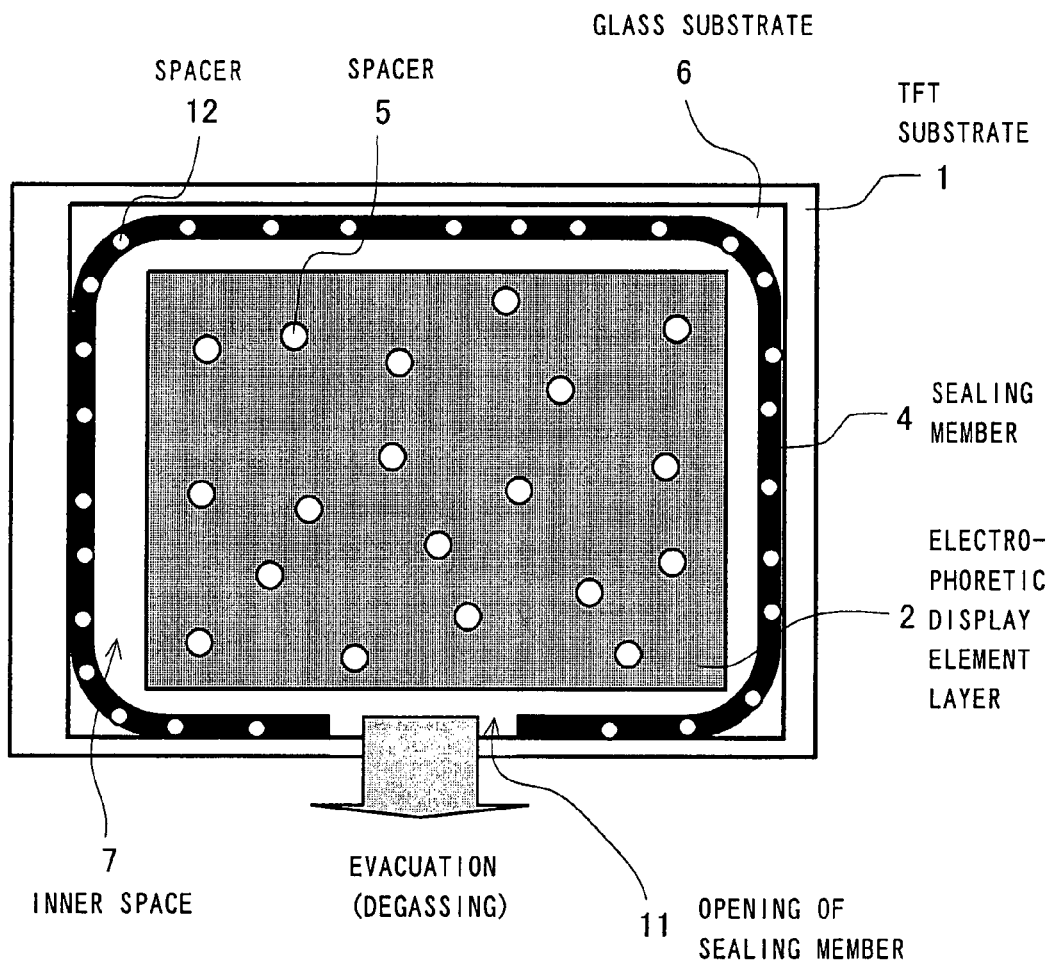
FIG. 11B (FIRST EMBODIMENT)
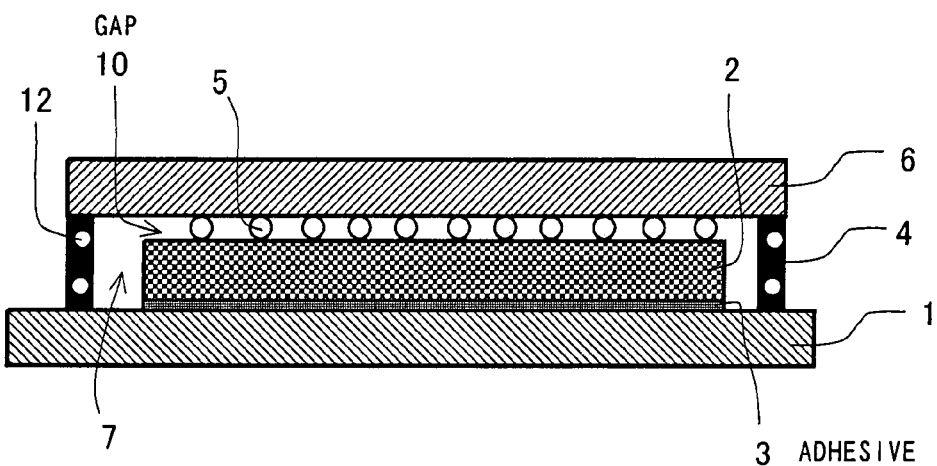

FIG. 12A (FIRST EMBODIMENT)
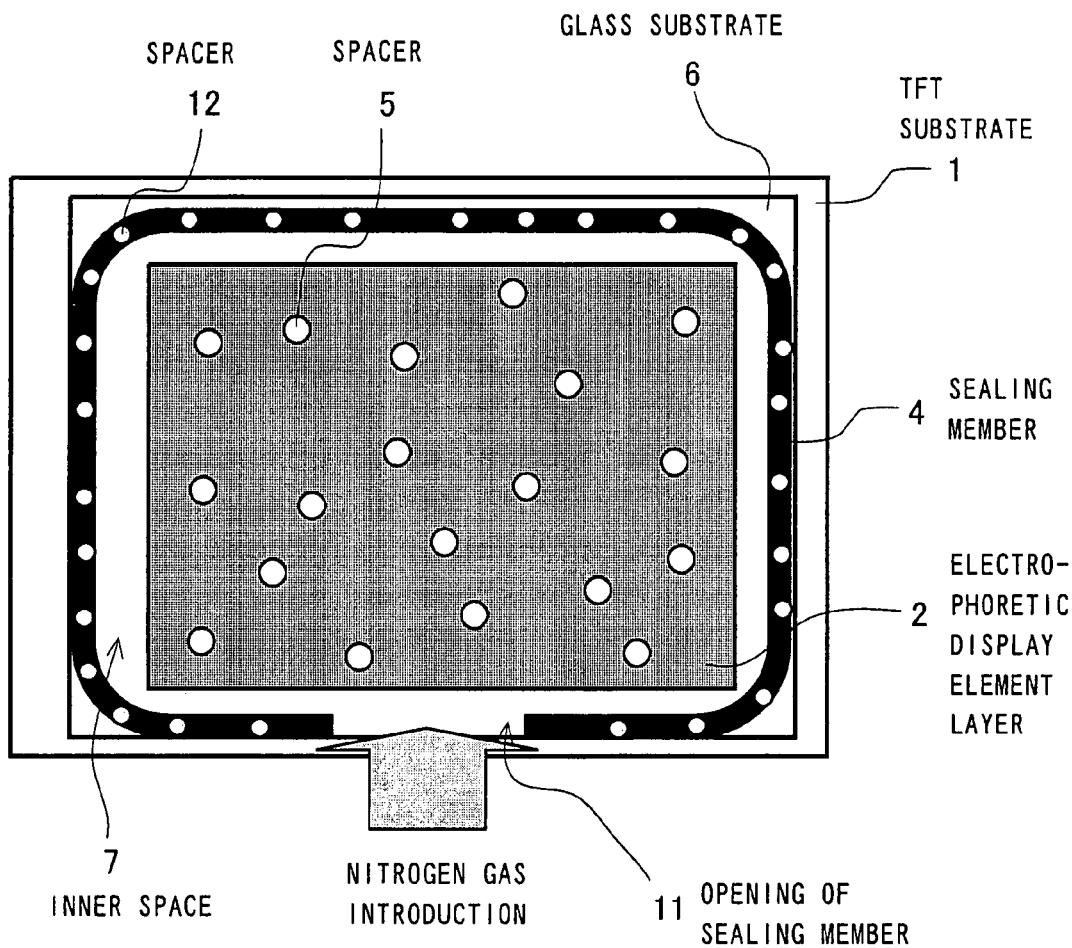
FIG. 12B (FIRST EMBODIMENT)
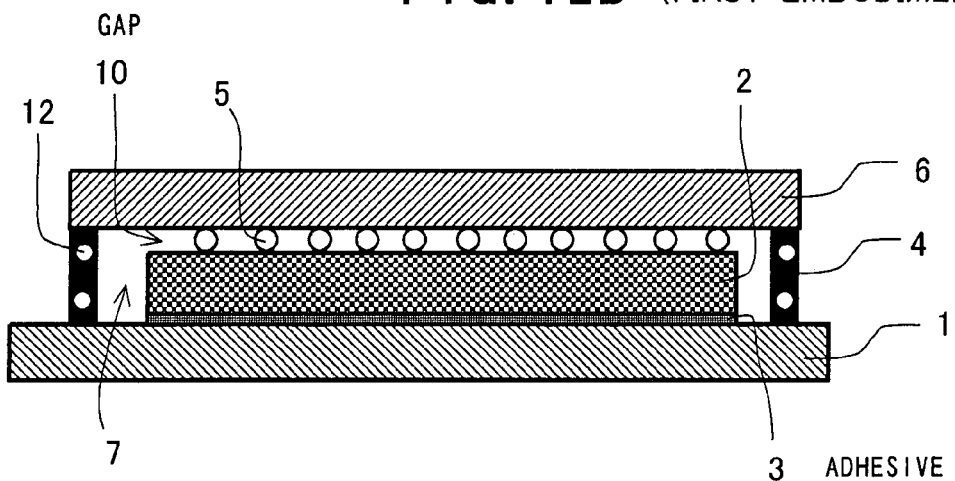

FIG. 13A (FIRST EMBODIMENT)
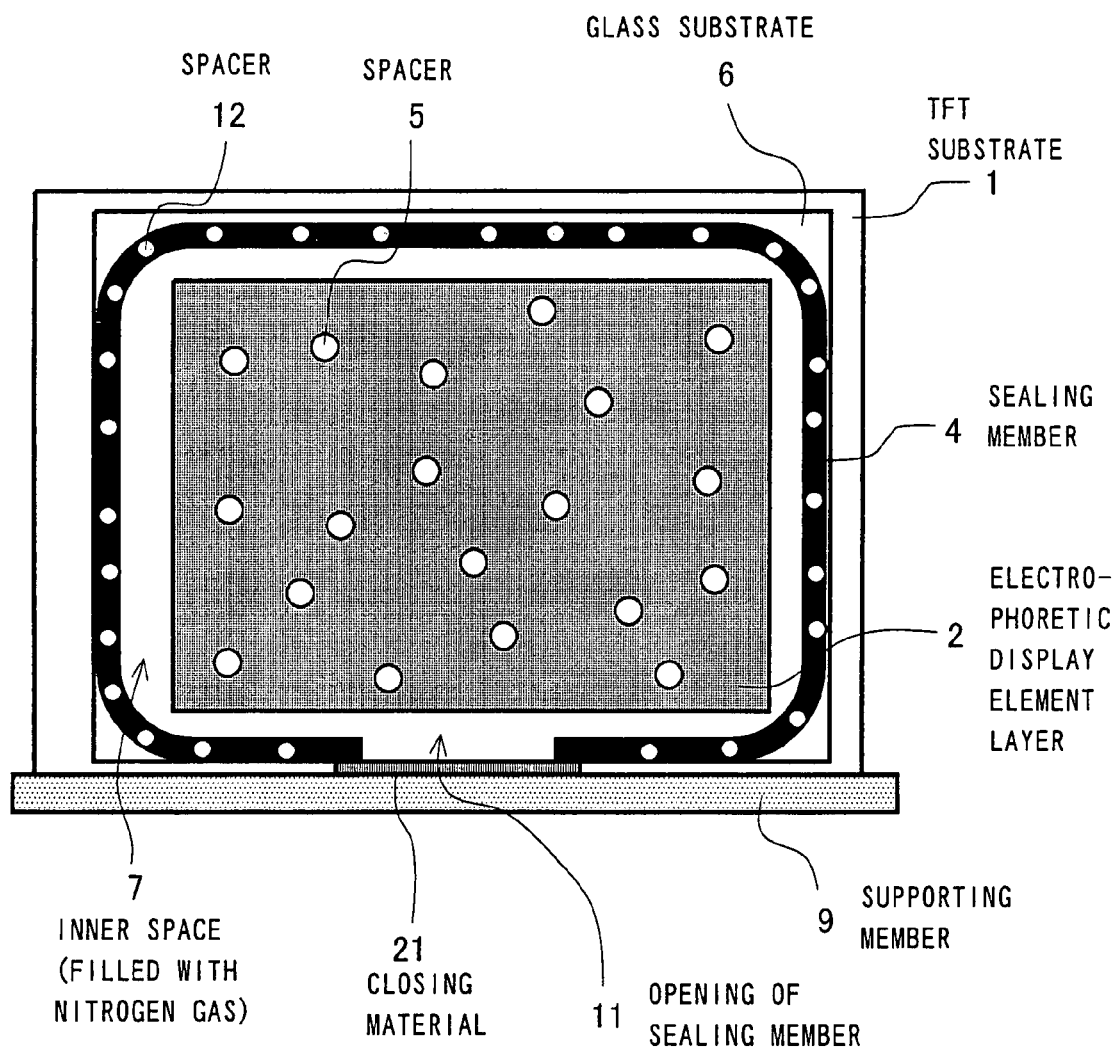
FIG. 13B (FIRST EMBODIMENT)
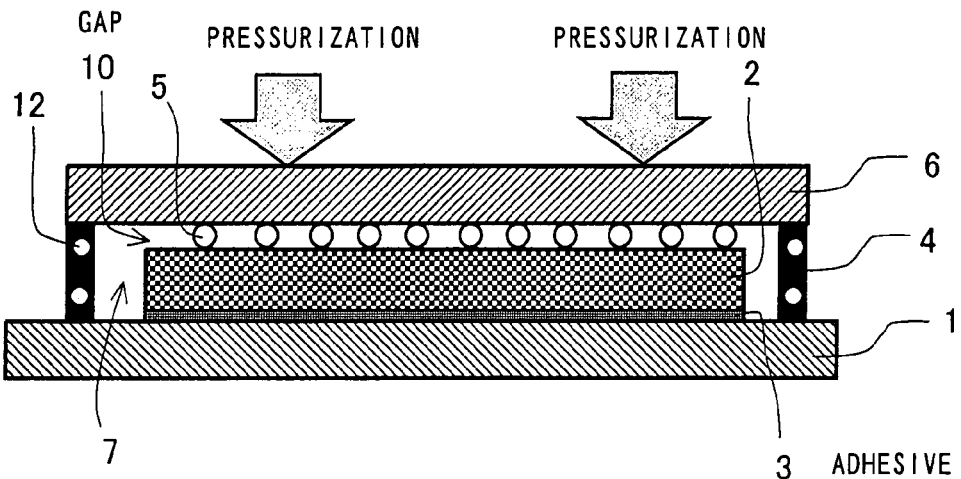

FIG. 14A (FIRST EMBODIMENT)
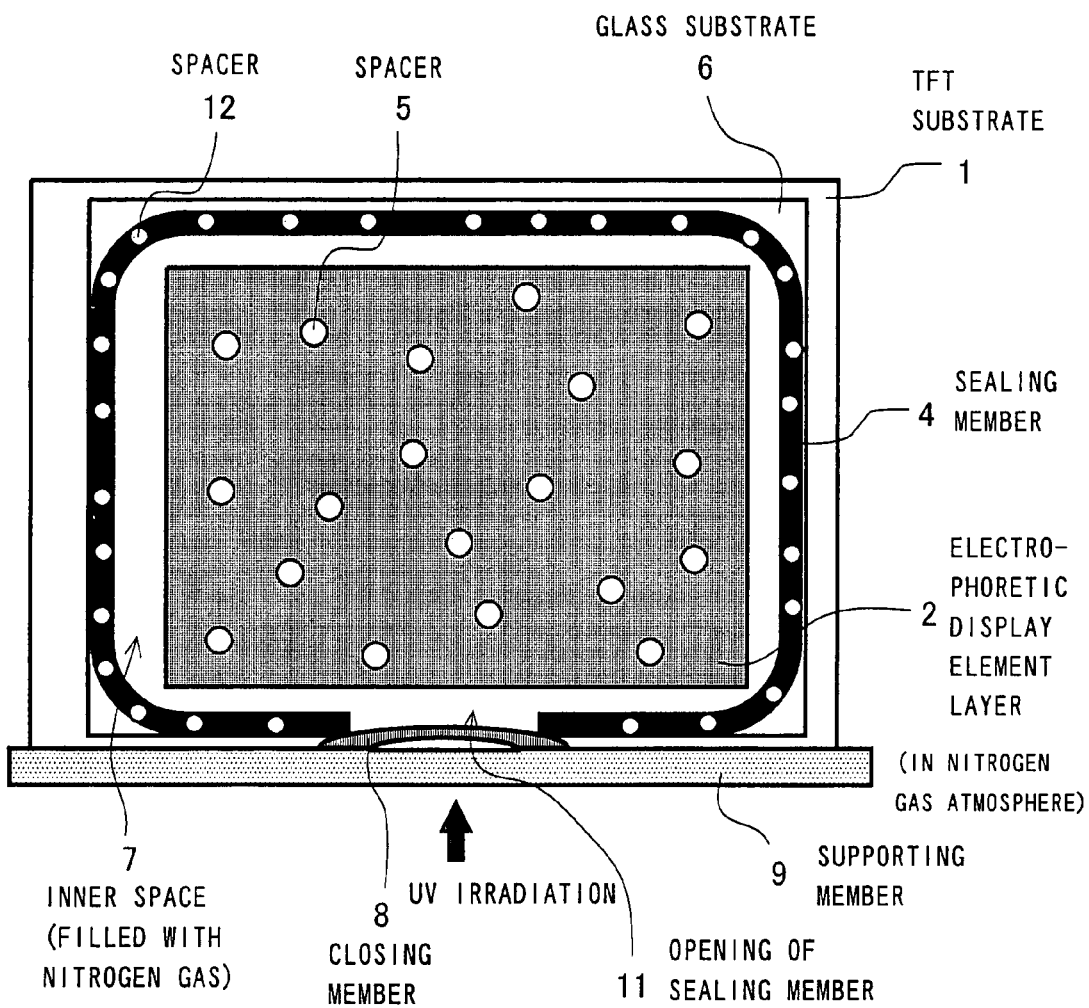
FIG. 14B (FIRST EMBODIMENT)
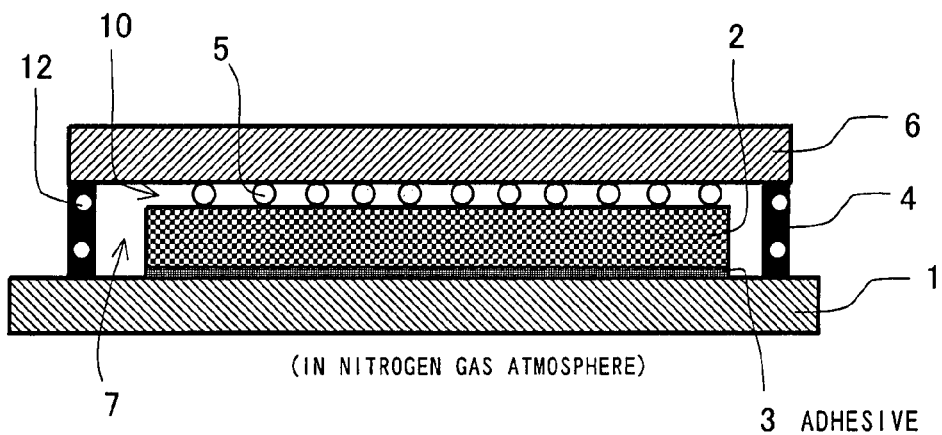

FIG. 15A (SECOND EMBODIMENT)
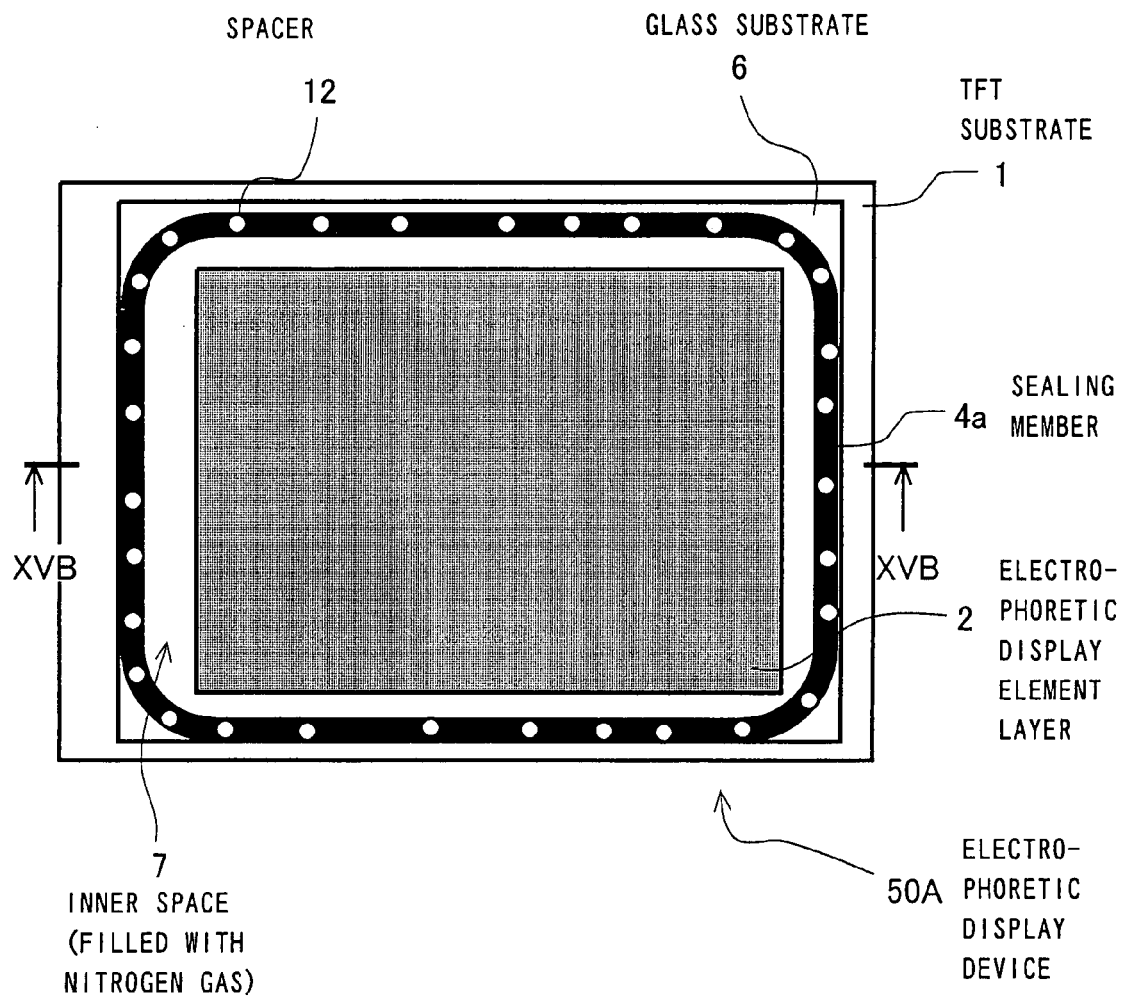
FIG. 15B (SECOND EMBODIMENT)
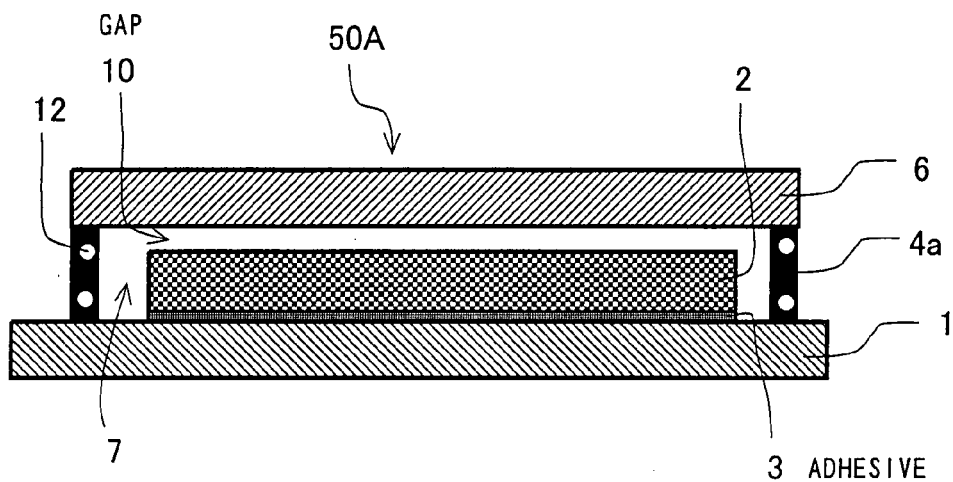

FIG. 16A (SECOND EMBODIMENT)
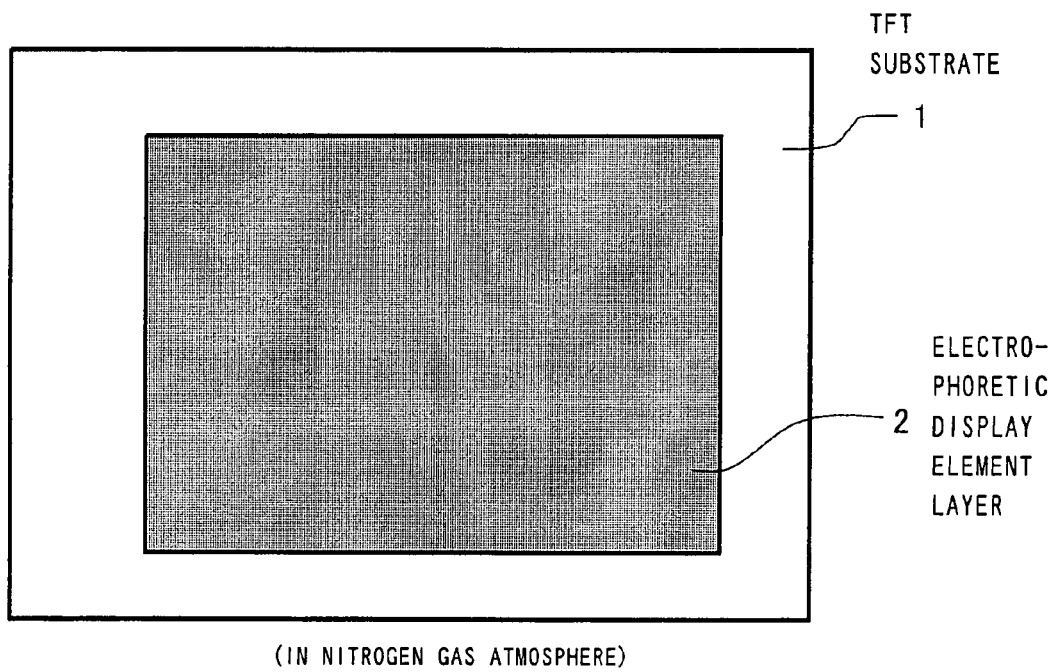
(IN NITROGEN GAS ATMOSPHERE)
TFT SUBSTRATE 1
ELECTRO-PHORETIC DISPLAY ELEMENT LAYER 2
FIG. 16B (SECOND EMBODIMENT)
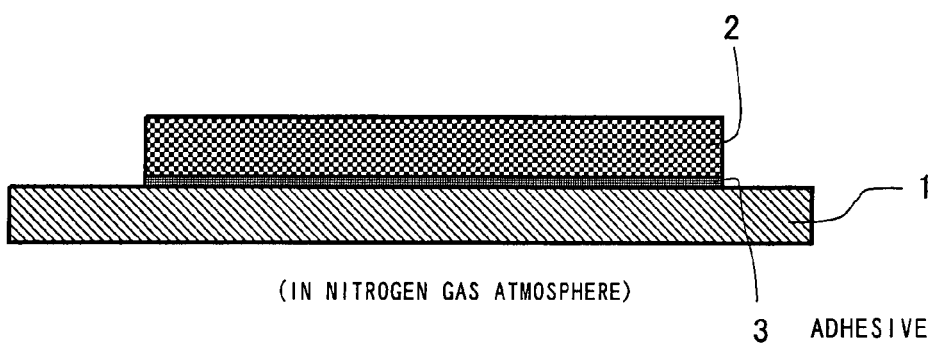
(IN NITROGEN GAS ATMOSPHERE)
2
1
3 ADHESIVE

FIG. 17A (SECOND EMBODIMENT)
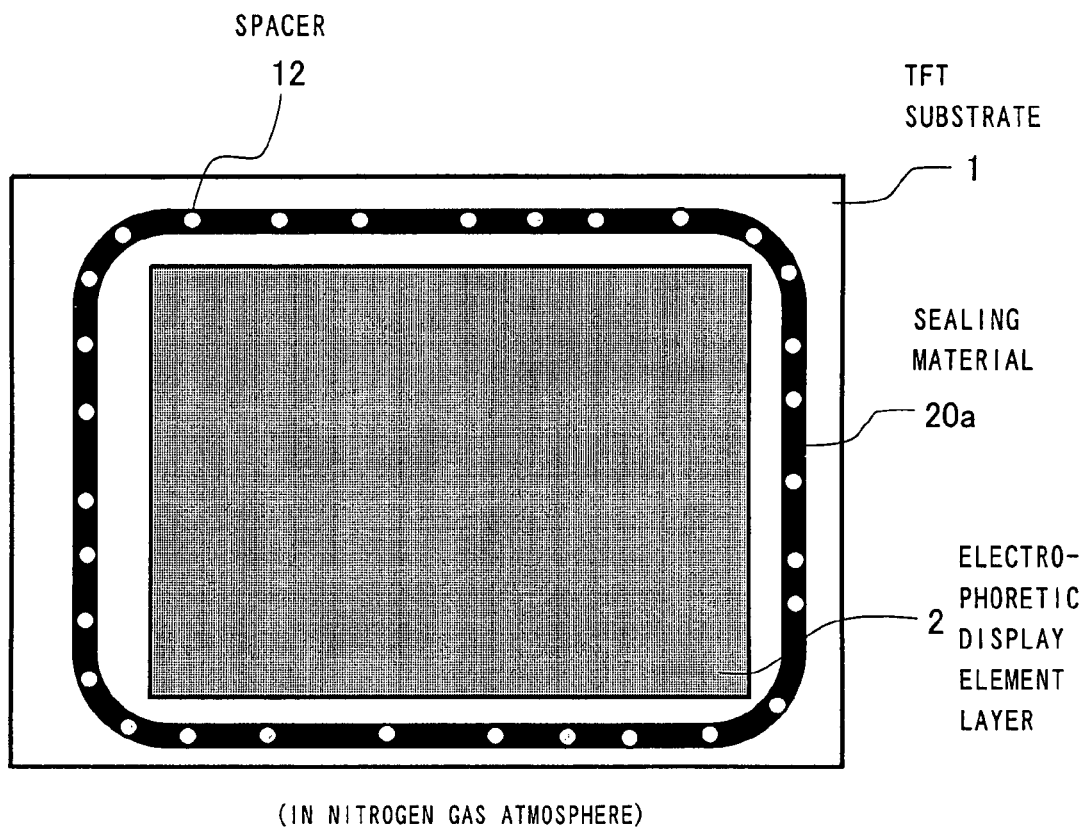
(IN NITROGEN GAS ATMOSPHERE)
FIG. 17B (SECOND EMBODIMENT)
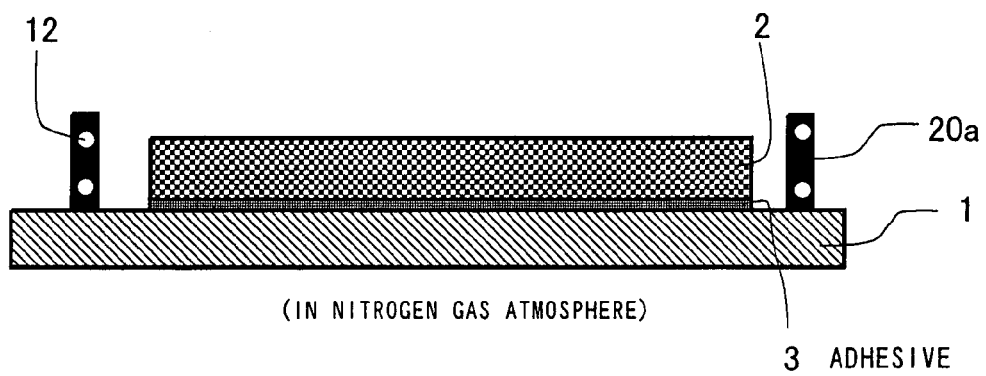
(IN NITROGEN GAS ATMOSPHERE)

FIG. 18A (SECOND EMBODIMENT)
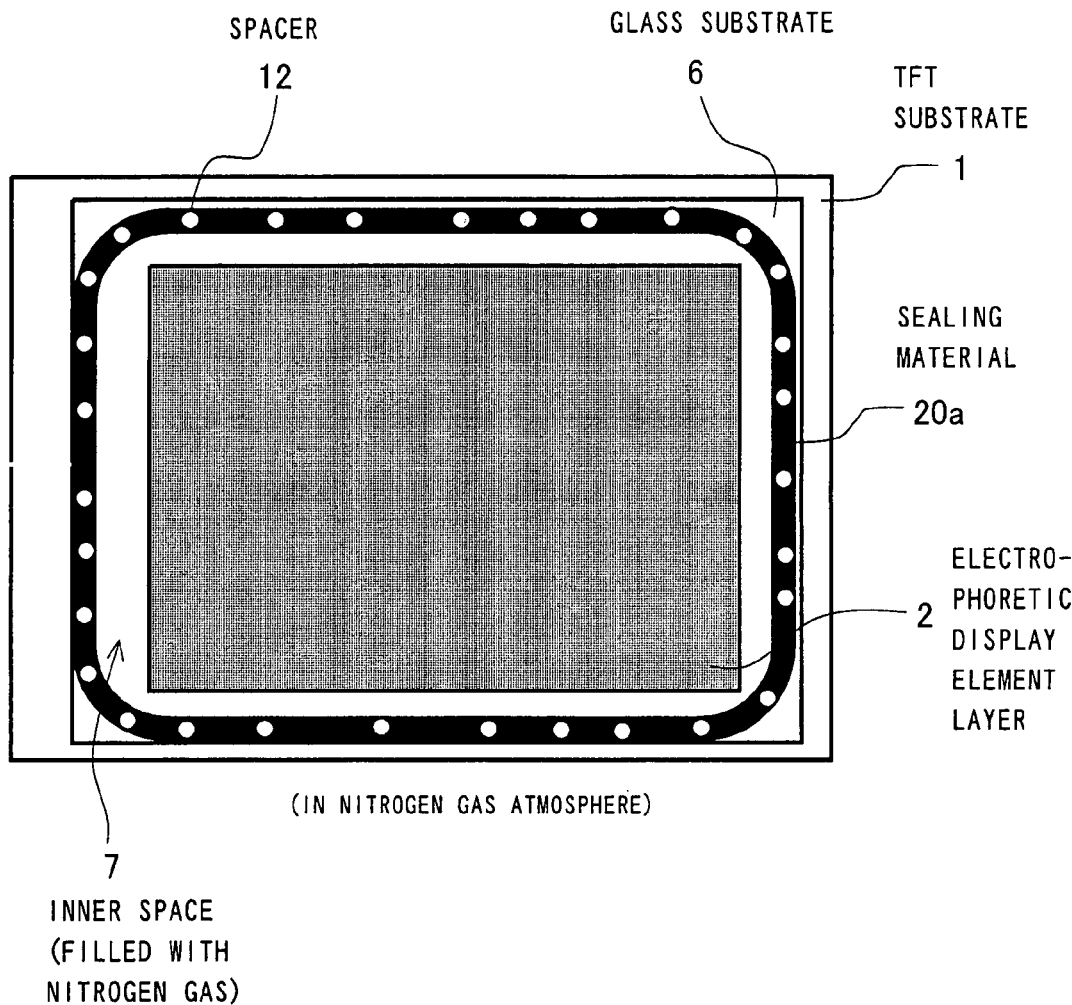
FIG. 18B (SECOND EMBODIMENT)
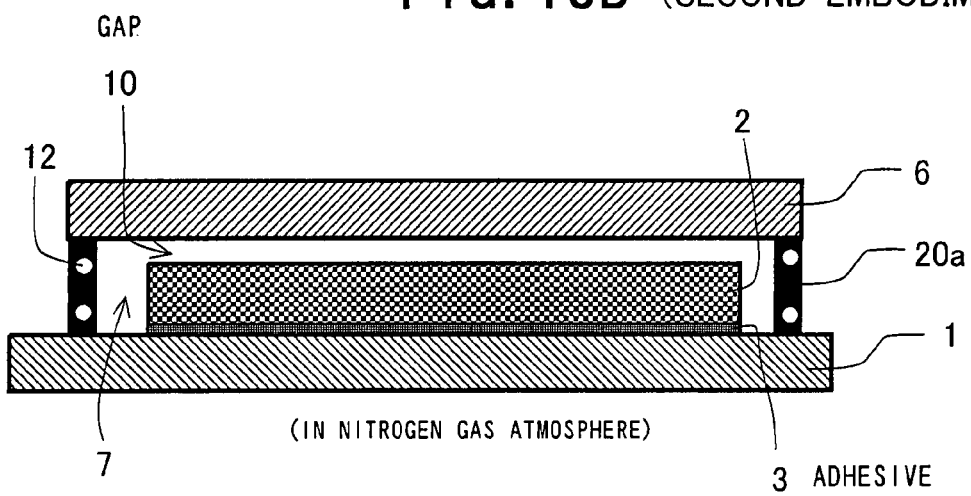

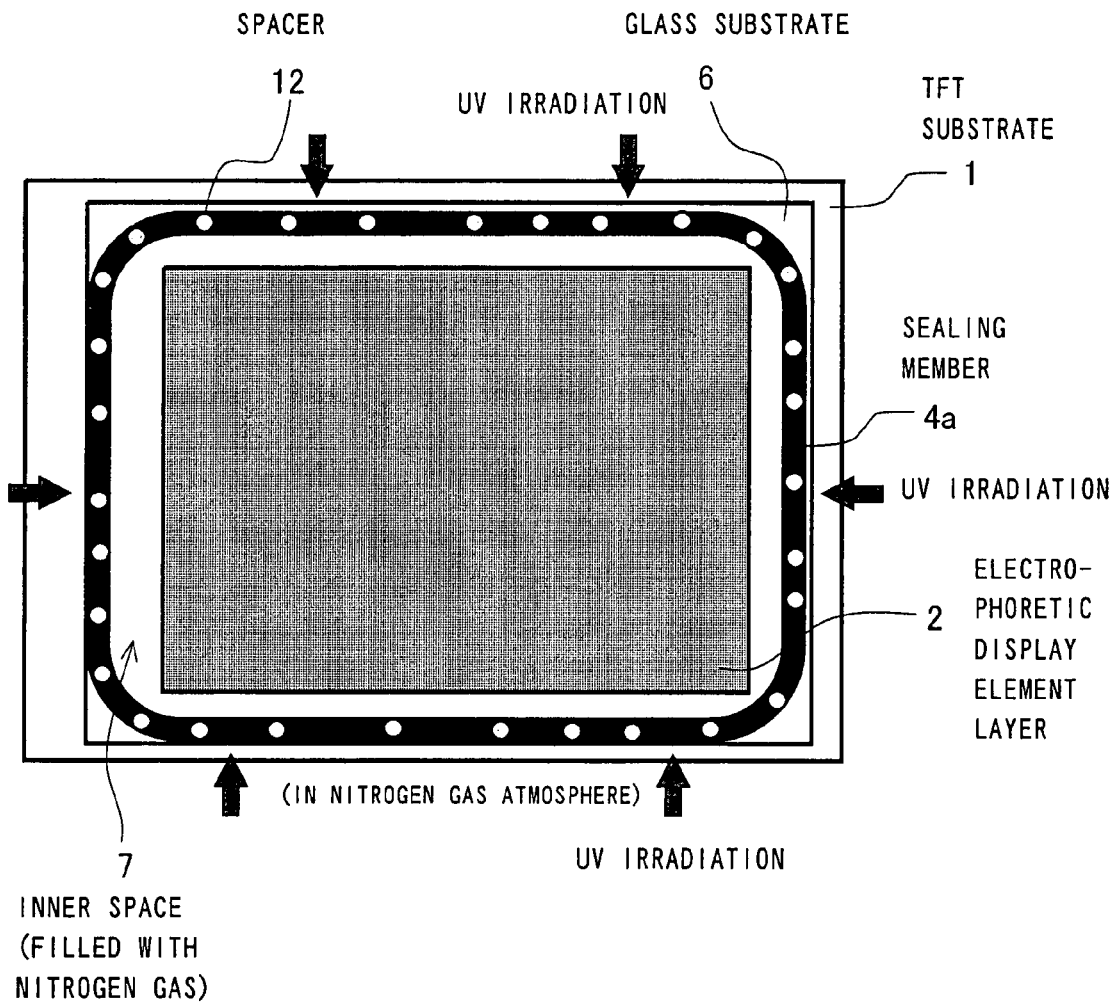
FIG. 19A (SECOND EMBODIMENT)
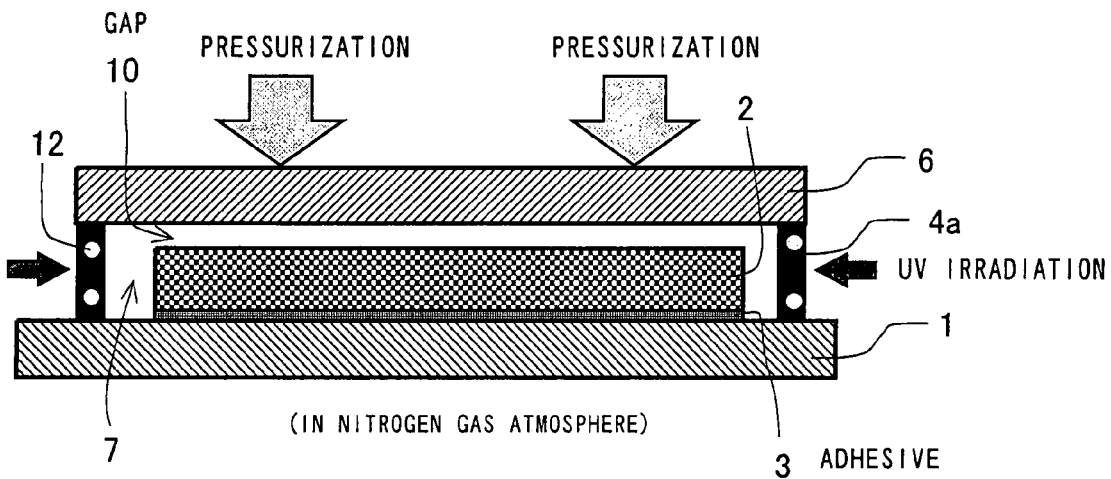
FIG. 19B (SECOND EMBODIMENT)

FIG. 20A (THIRD EMBODIMENT)
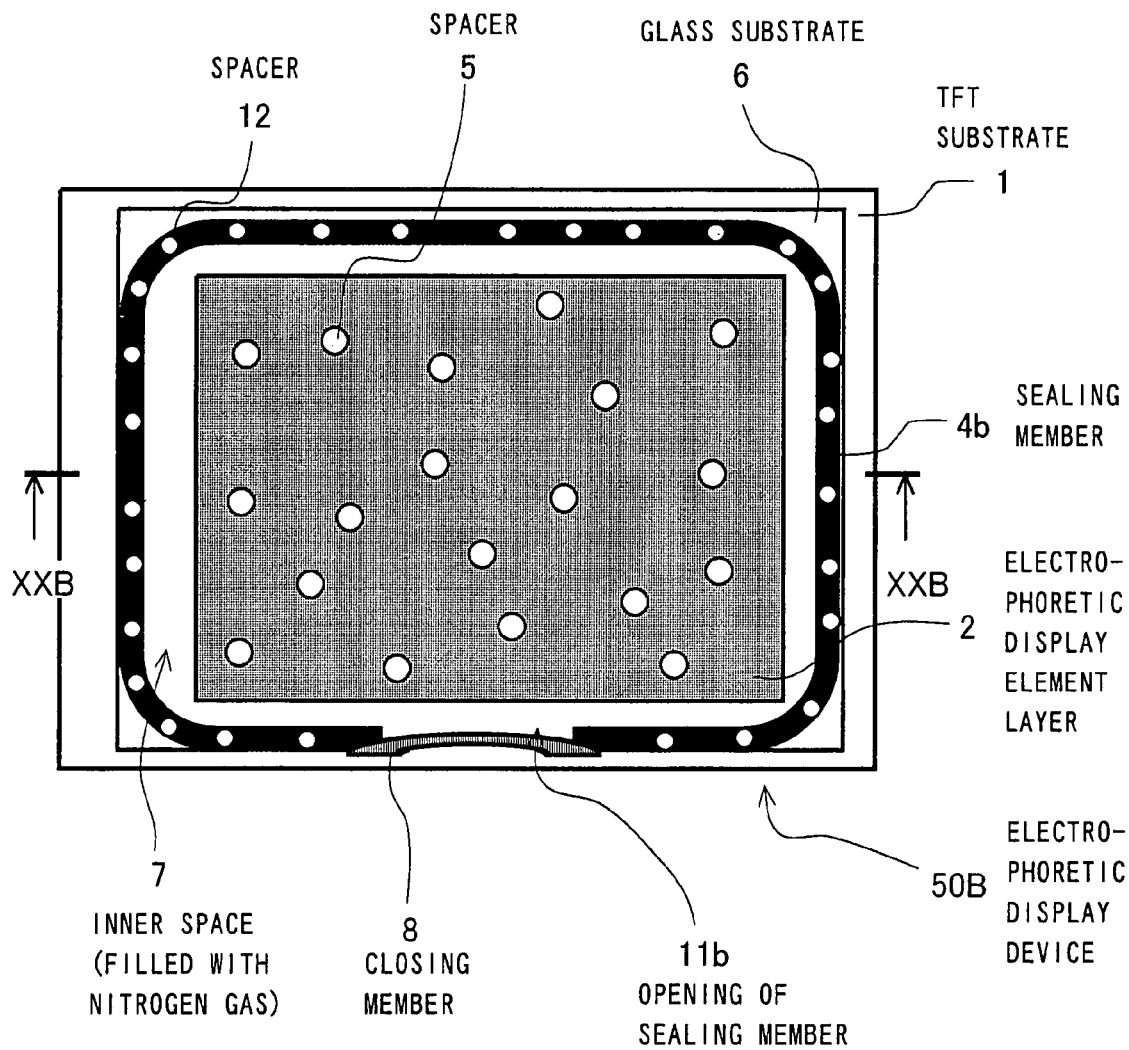
FIG. 20B (THIRD EMBODIMENT)
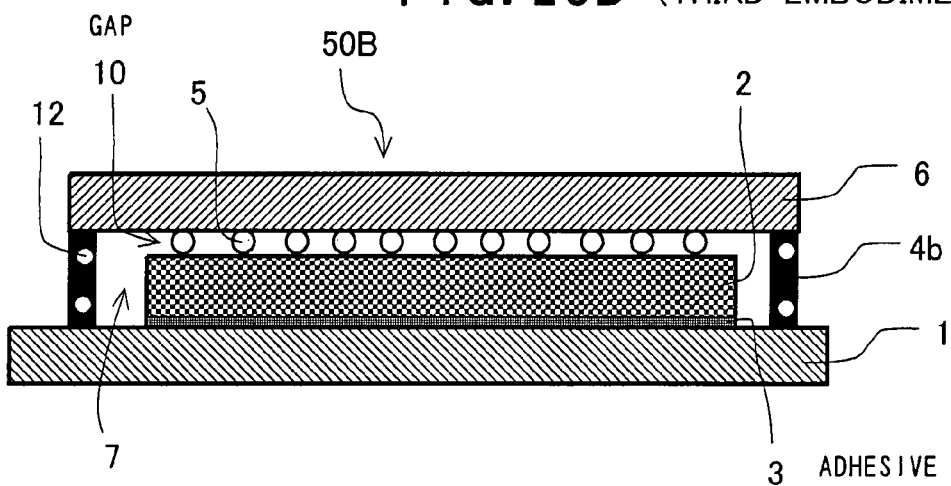

FIG. 21A (THIRD EMBODIMENT)
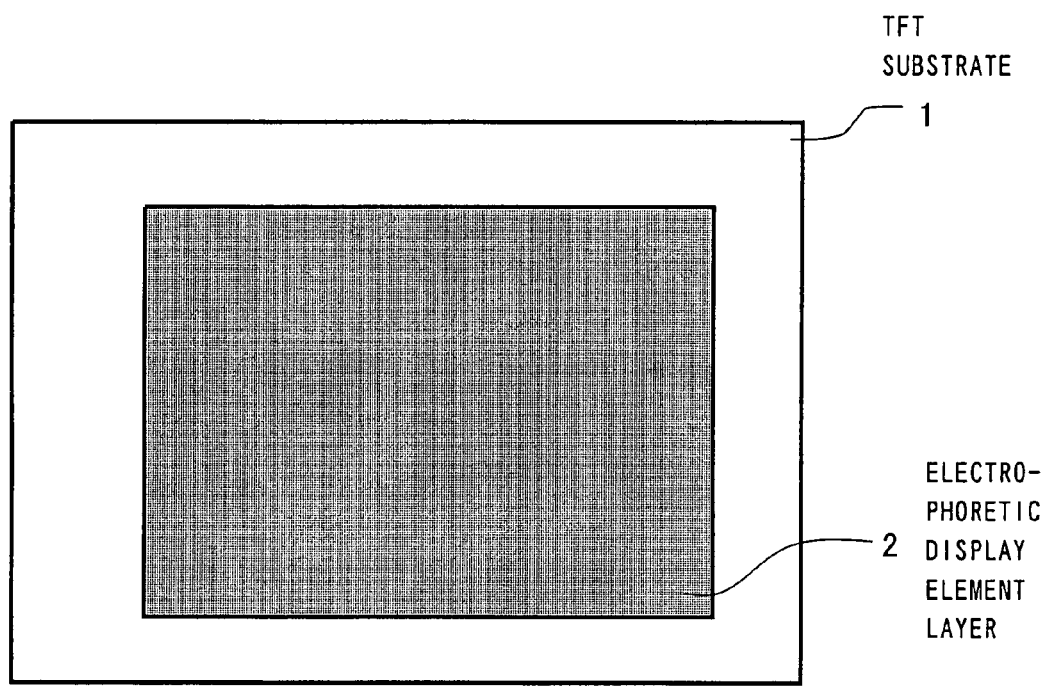
TFT SUBSTRATE — 1
ELECTRO-PHORETIC DISPLAY ELEMENT LAYER — 2
FIG. 21B (THIRD EMBODIMENT)
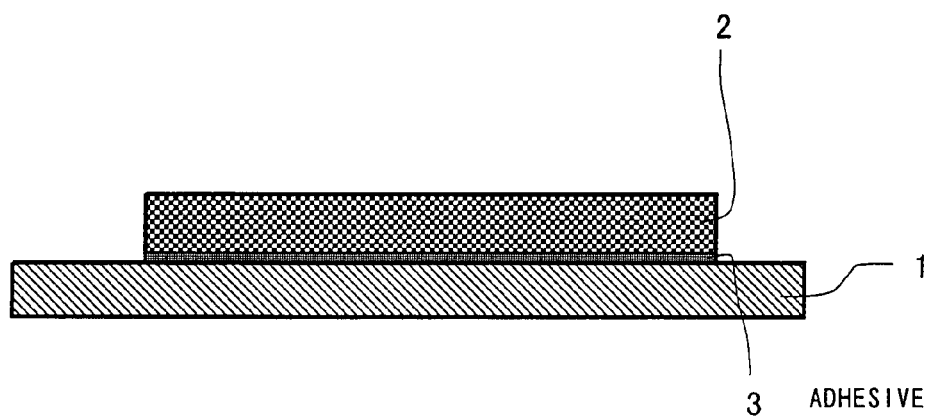
3 ADHESIVE

FIG. 22A (THIRD EMBODIMENT)
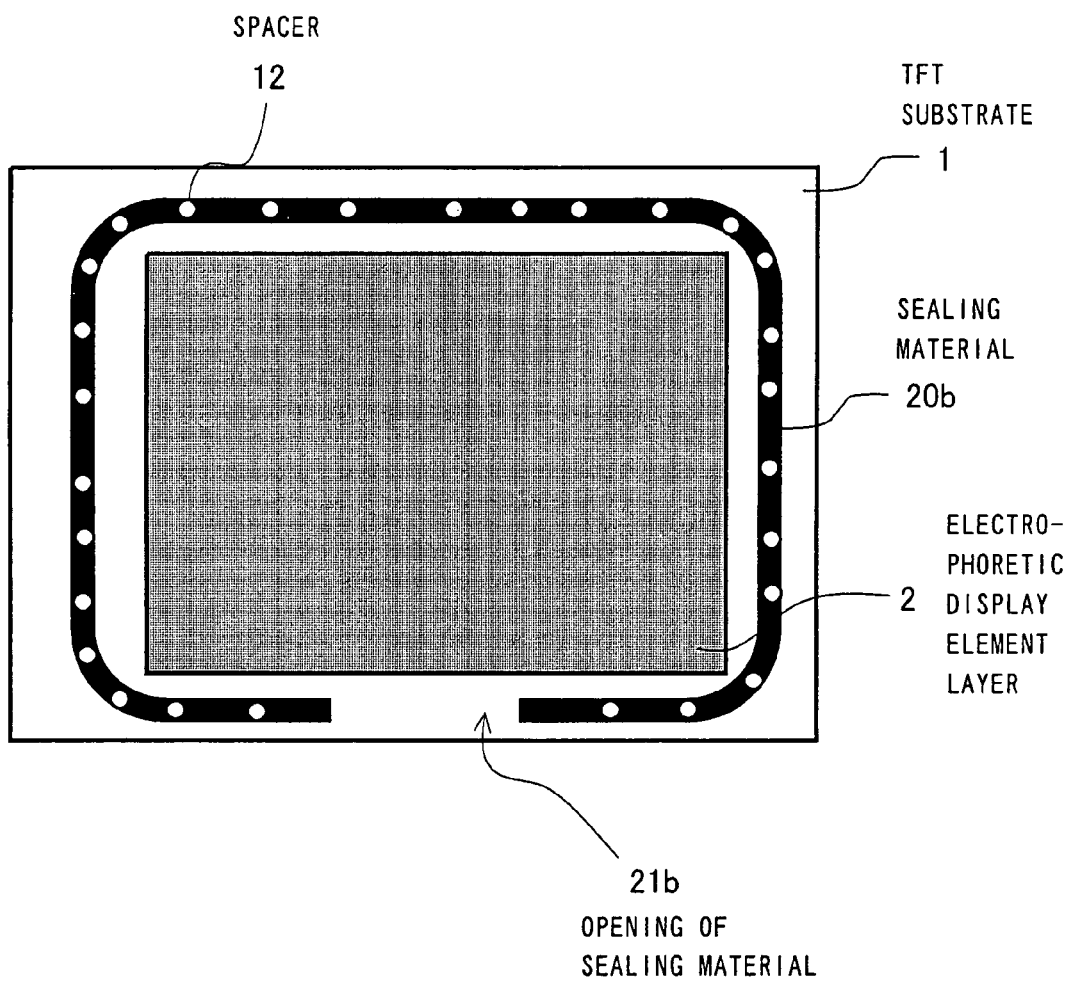
FIG. 22B (THIRD EMBODIMENT)
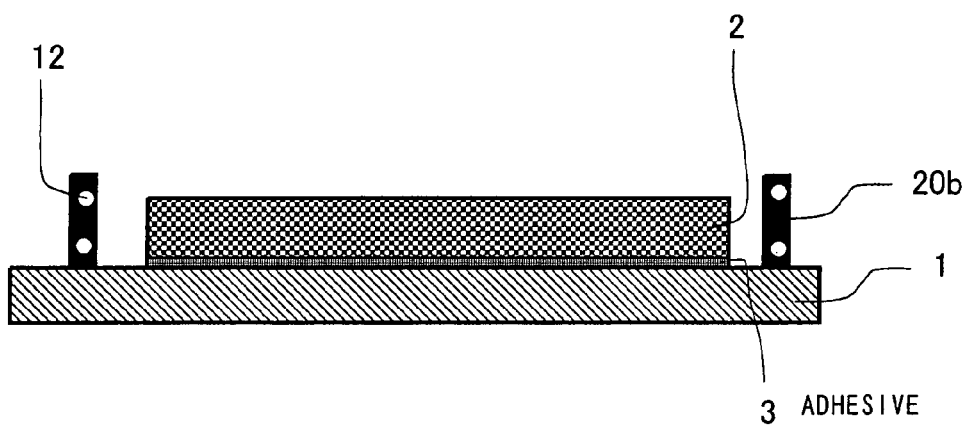

FIG. 23A (THIRD EMBODIMENT)
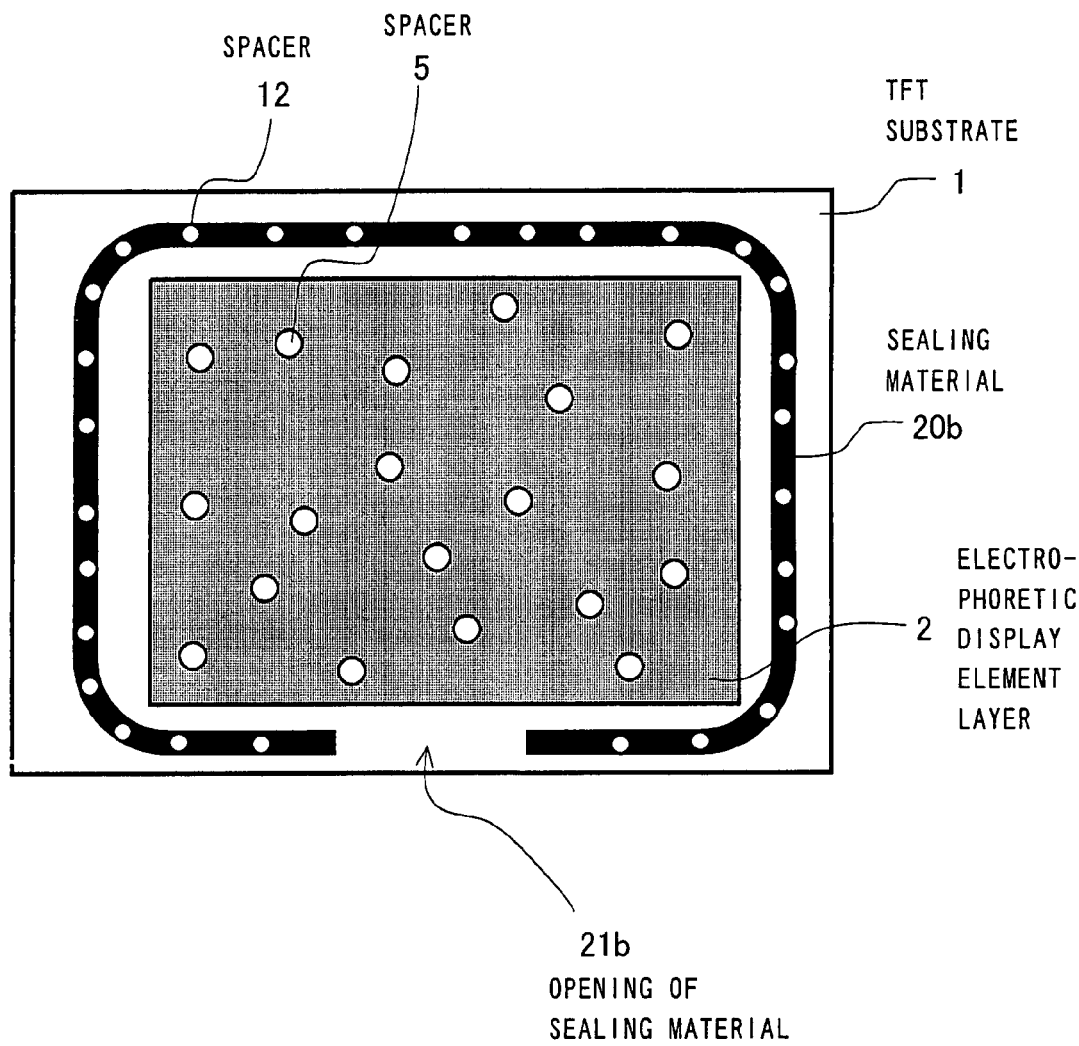
FIG. 23B (THIRD EMBODIMENT)
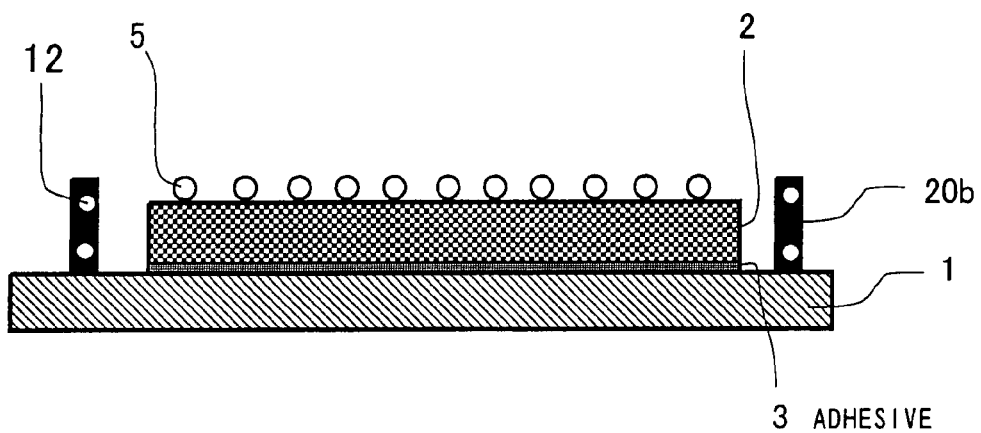

FIG. 24A (THIRD EMBODIMENT)
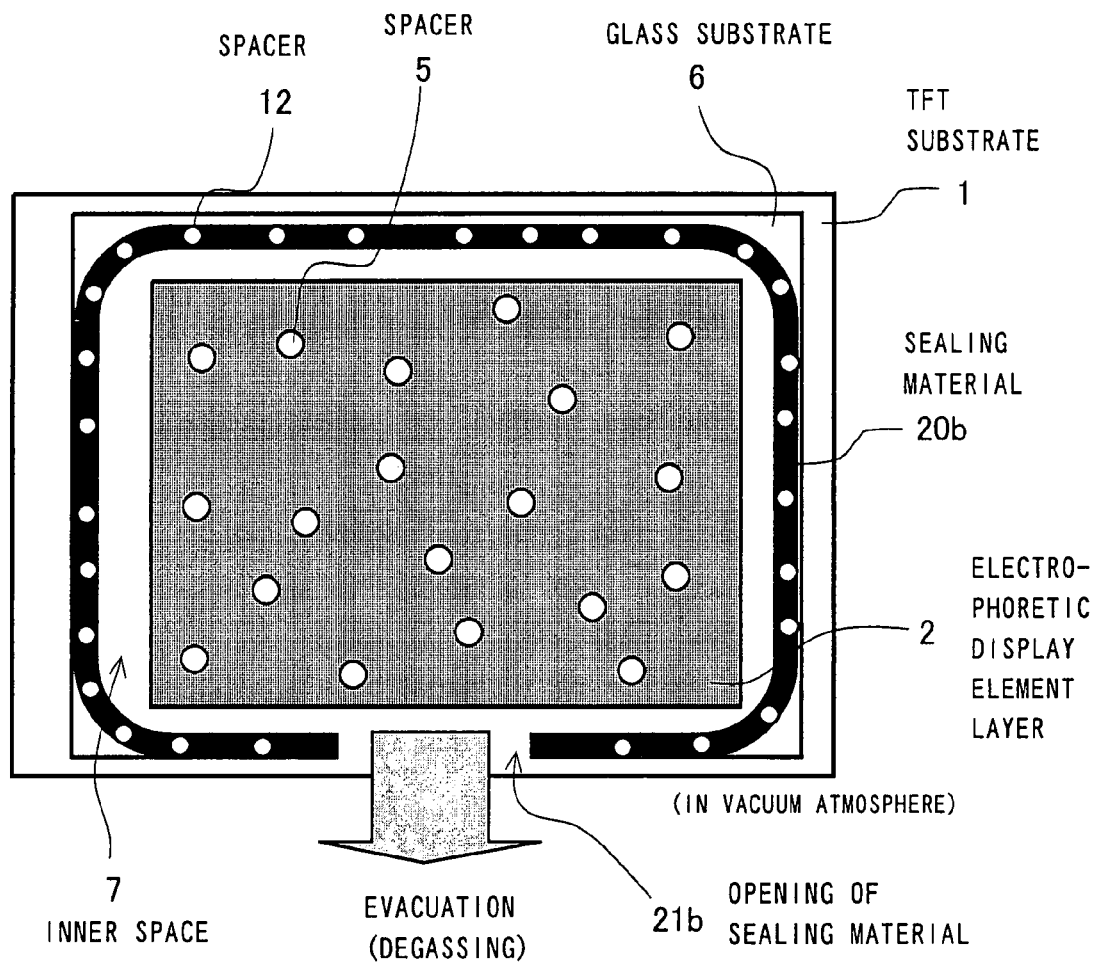
FIG. 24B (THIRD EMBODIMENT)
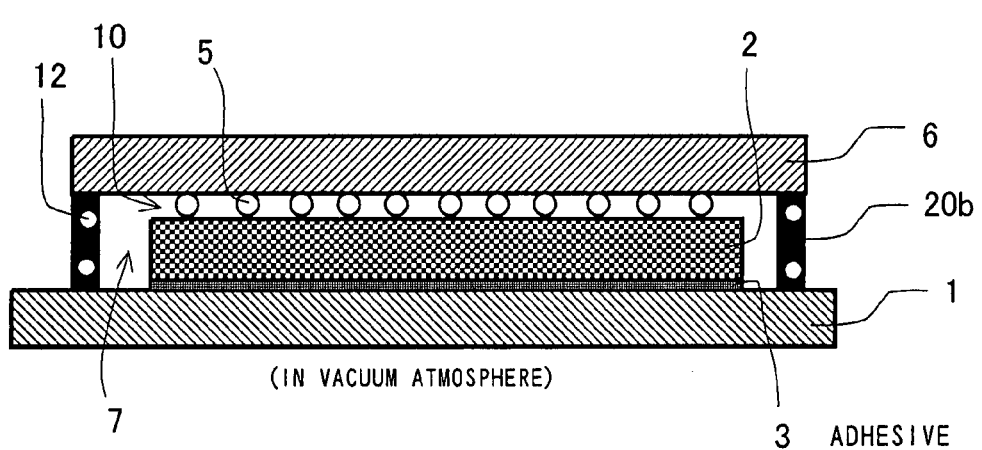

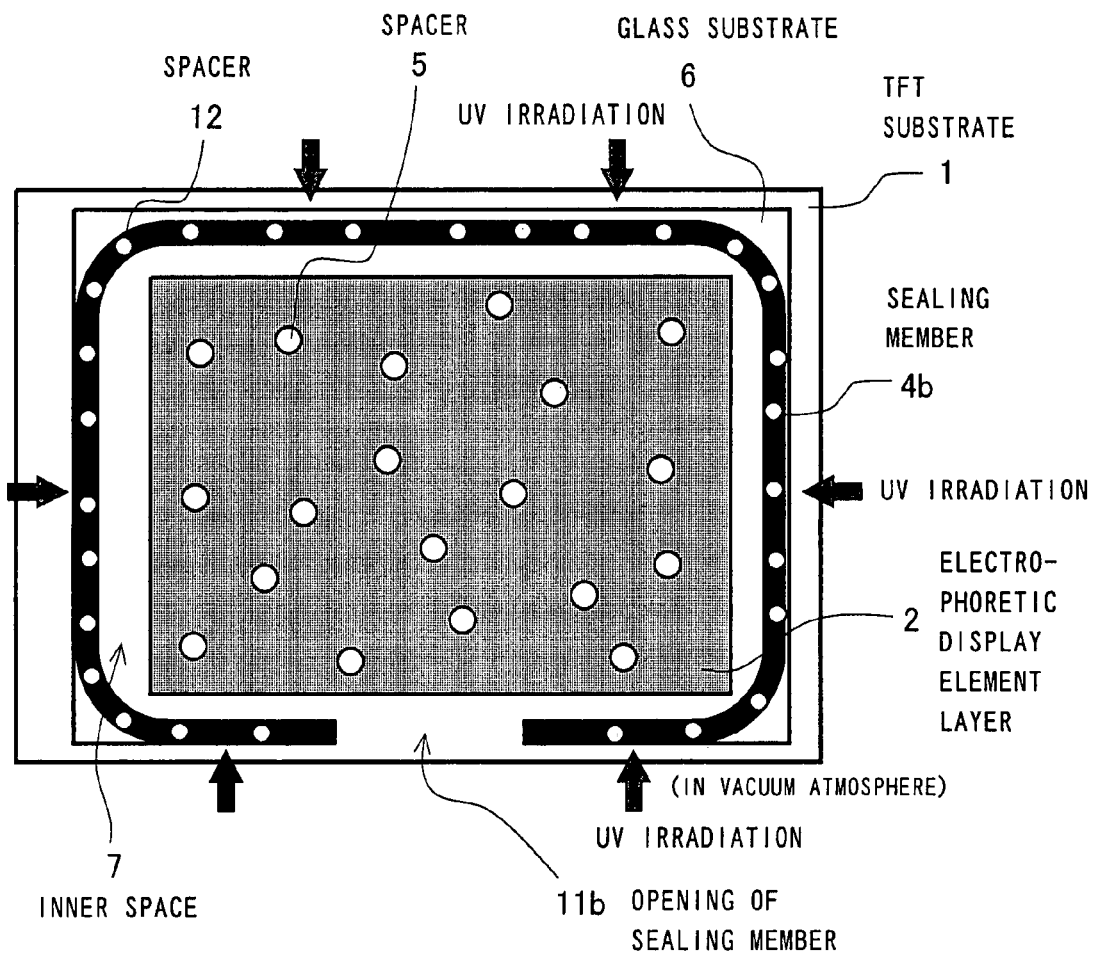
FIG. 25A (THIRD EMBODIMENT)
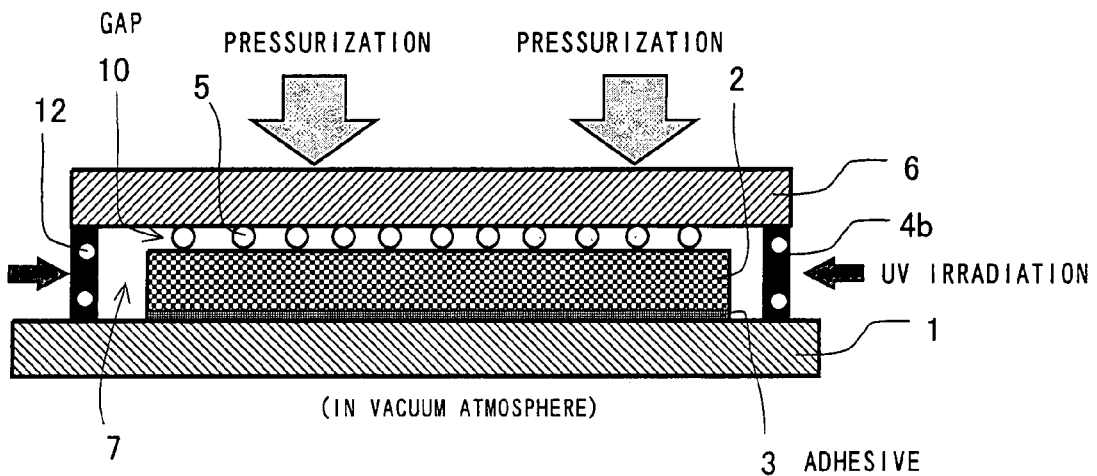
FIG. 25B (THIRD EMBODIMENT)

FIG. 26A (THIRD EMBODIMENT)
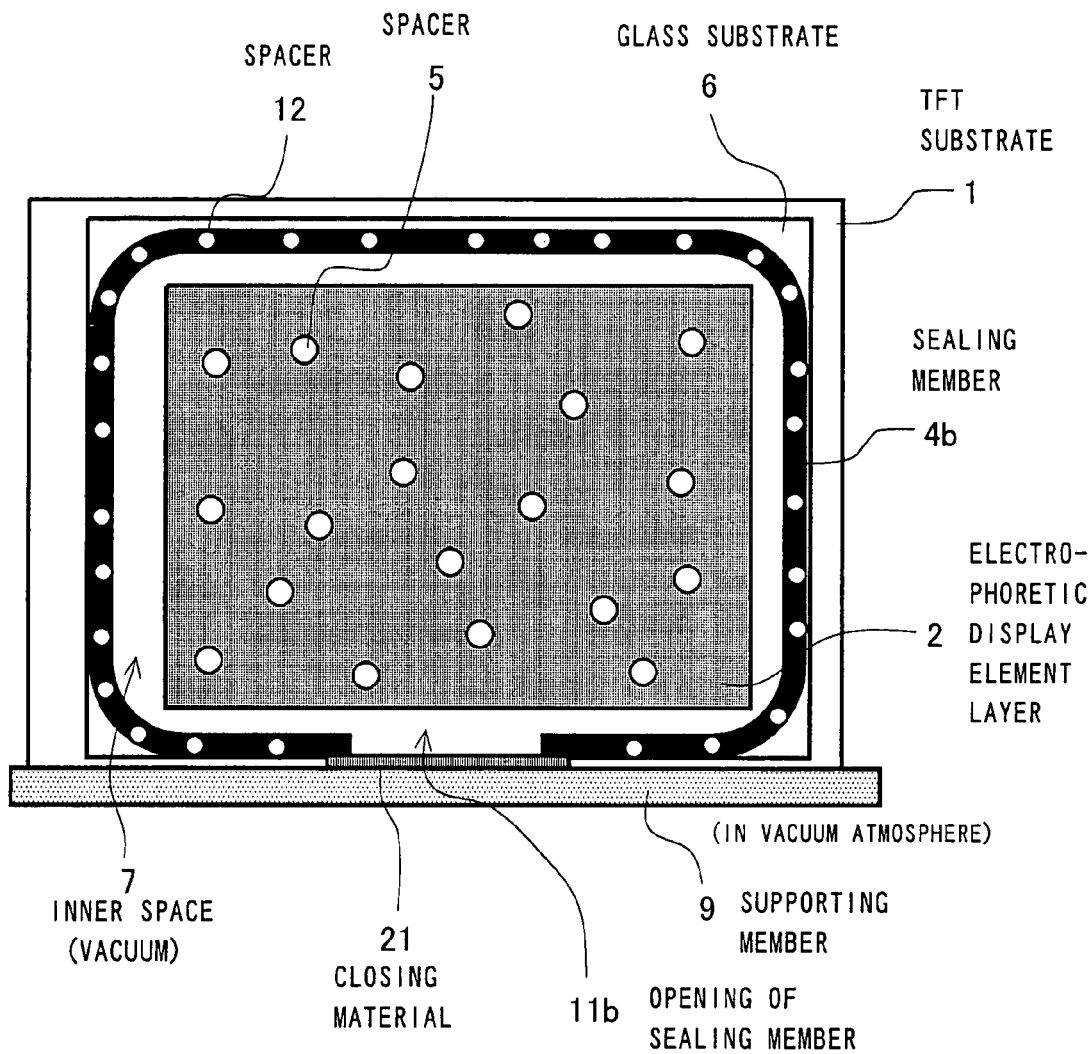
FIG. 26B (THIRD EMBODIMENT)
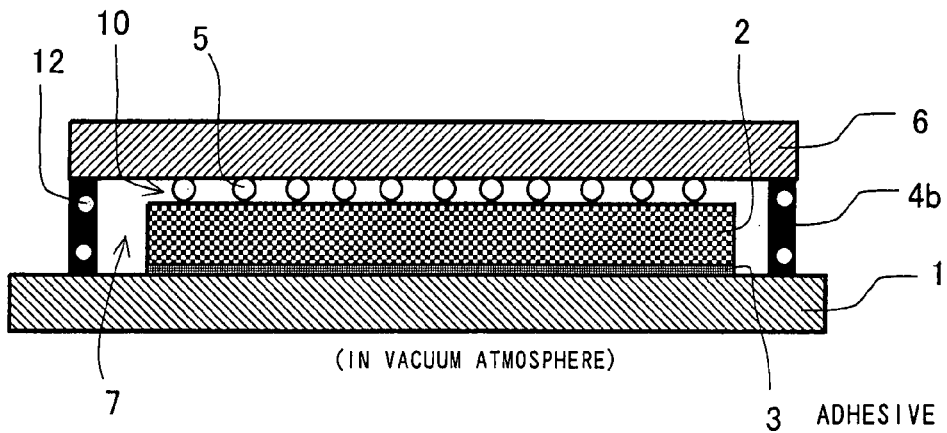

FIG. 27A (FIRST EMBODIMENT)
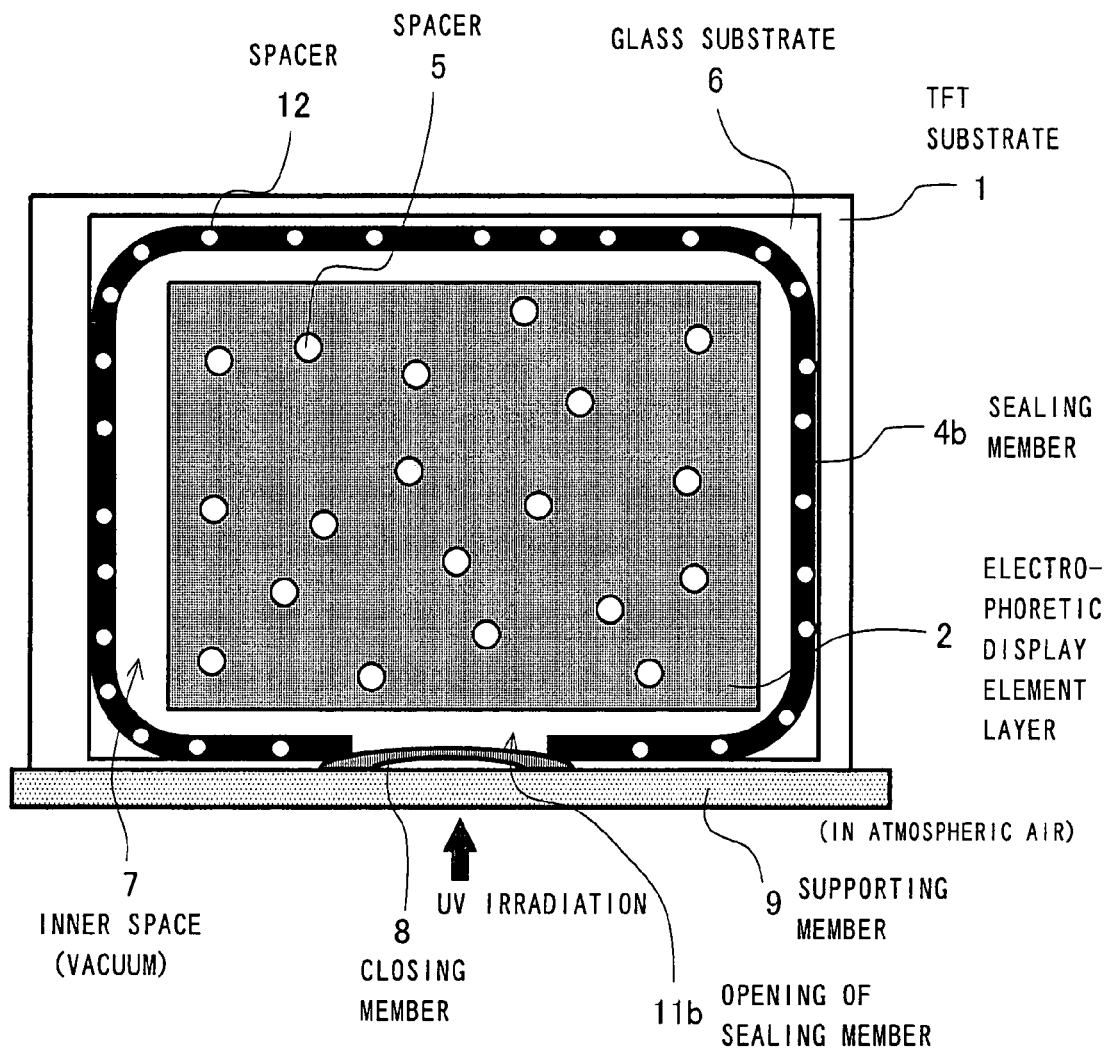
FIG. 27B (FIRST EMBODIMENT)
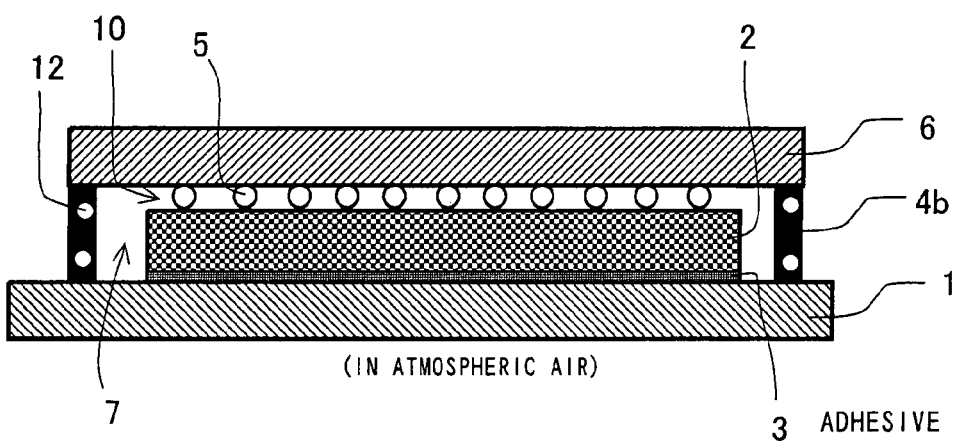

ELECTROPHORETIC DISPLAY DEVICE AND METHOD OF FABRICATING THE SAME

BACKGROUND OF THE INVENTION

1. Field of the Invention

The present invention relates to an electrophoretic display device and a method of fabricating the same. More particularly, the invention relates to an electrophoretic display device including a substrate with switching elements and driving electrodes, and an electrophoretic display element layer placed on the substrate, and a method of fabricating the device.

2. Description of the Related Art

In recent years, Liquid-Crystal Display (LCD) devices have been used extensively in a variety of fields. This is because LCD devices have the feature of reduced thickness and weight. Recently, the price of LCD devices has been lowered subsequent to the productivity improvements and at the same time, the screen size thereof has been able to be enlarged. Therefore, the application range of LCD devices has been expanding more and more.

On the other hand, as the display device that realizes further thickness reduction than LCD devices and significant reduction of power consumption, electrophoretic display devices have been developed. Electrophoretic display devices, which utilize the electrophoresis phenomenon, i.e., the phenomenon that charged particles dispersed in a liquid are moved in the liquid in response to an electric field applied thereto from the outside, have several types. For example, with the microcapsule type electrophoretic display device, a transparent liquid, black minute particles electrically charged negatively (black pigment particles), and white minute particles electrically charged positively (white pigment particles) are enclosed in each of microcapsules. A pair of electrodes (i.e., a driving electrode and a common electrode) is arranged at each side of the microcapsule. By applying a voltage across the pair of electrodes, the black minute particles and the white minute particles are moved (or displaced) in the microcapsule, thereby displaying characters and images.

When the potential of the electrode (i.e., the common electrode) placed on the viewing side is positive, the black minute particles are attracted toward the said electrode and the white minute particles are moved toward the opposite side away from the said electrode. Therefore, the region of the said microcapsule is seen black. On the other hand, when the potential of the electrode placed on the viewing side is negative, the white minute particles are attracted toward the said electrode and the black minute particles are moved toward away from the said electrode. Therefore, the region of the said microcapsule is seen white. In this way, black and white (monochrome) characters and images can be displayed.

Moreover, the states of the black minute particles and the white minute particles are stable at their two positions adjacent to the pair of electrodes (i.e., the driving electrode and the common electrode) placed at each side of the said microcapsule, in other words, these particles are bistable (bistability). Thus, even if the application of the voltage is stopped, the states of these particles are maintained unchanged (memory effect). Accordingly, it is unnecessary to continue the application of the voltage to keep the displayed characters and/or images, which makes it possible to reduce the power consumption significantly.

The size of the microcapsules is in the range of several tens micrometers (μm) to several hundreds micrometers (μm). Therefore, if the microcapsules are dispersed in a transparent binder, they will have an ink-like state and as a result, they may be coated on a plane by a printing method. For this reason, the binder containing the microcapsules dispersed therein may be termed the "electronic ink".

The electrophoretic display device has several types other than the microcapsule type, such as the microcup type, electronic liquid powder type, and so on. The present invention relates to an electrophoretic display device of any of these types, which has an "electrophoretic display element layer", in other words, a layer of electrophoretic display elements or a set of layer-shaped electrophoretic display elements. It is preferred that these electrophoretic display elements have bistability.

FIG. 1A is a plan view showing the schematic structure of a prior-art electrophoretic display device, and FIG. 1B is a cross-sectional view along the line IB-IB in FIG. 1A.

A prior-art electrophoretic display device 150 shown in FIGS. 1A and 1B comprises a TFT substrate 101 having Thin-Film Transistors (TFTs) and predetermined driving electrodes (both of which are not shown) arranged in a matrix array on the predetermined display region, a bistable electrophoretic display element layer 102 fixed on the display region of the TFT substrate 101, a transparent protection film 105 covered on the electrophoretic display element layer 102, and a sealing member 104 formed to surround the peripheries of the display element layer 102 and the protection film 105.

The bistable electrophoretic display element layer 102, which comprises a common electrode (not shown) formed on a main surface (back surface) thereof on the same side as the TFT substrate 101, is fixed on the display region of the TFT substrate 101 with an adhesive 103. The protection film 105 is adhered to another main surface (front surface) of the display element layer 102 on the opposite side to the TFT substrate 101 with an adhesive 106. The protection film 106 covers entirely the said main surface of the display element layer 102. A person will see the characters and/or images displayed by the device 150 from the side of the protection film 106 (from the upper side in FIGS. 1A and 1B).

The periphery (side faces) of the layered structure formed by the electrophoretic display element layer 102 and the protection film 105 is covered with the sealing member 104. The purpose of the sealing member 104 is to prevent the moisture existing in the air and the air itself from entering the inside of the layer 102. Specifically, the entry of the moisture and the air into the layer 102 from the back surface (i.e., the lower surface in FIG. 1B) of the layered structure on the side of the TFT substrate 101 is prevented by the TFT substrate 101. The entry of the moisture and the air into the layer 102 from the front surface (i.e., the upper surface in FIG. 1B) of the layered structure on the opposite side to the TFT substrate 101 is prevented by the protection film 105. However, the respective side faces of the layered structure are kept opened. Therefore, the entry of the moisture and the air into the layer 102 from the side faces of the layered structure needs to be prevented by the sealing member 104. Since the plan shape of the layered structure is rectangular, the plan shape of the sealing member 104 is like a rectangular ring in FIGS. 1A and 1B.

The prior-art electrophoretic display device 150 having the above-described structure is fabricated in the following way.

Specifically, first, as shown in FIGS. 2A and 2B, the electrophoretic display element layer 102 having the adhesive 103 on its back surface is heated to a predetermined temperature, thereby softening the adhesive 103. Then, the display element layer 102 is placed and pressed on the display region of the TFT substrate 101 while aligning the position of the display element layer 102 with the said display region. In this way, the display element layer 102 is adhered onto the display region of the TFT substrate 101. Thereafter, a predetermined bubble elimination process (which is known) is carried out, thereby eliminating the bubbles remaining between the display element layer 102 and the TFT substrate 101.

Next, as shown in FIGS. 3A and 3B, the protection film 105 having the adhesive 106 on its back surface is adhered to the surface of the display element layer 102 while aligning the position of the protection film 105 with the said surface of the layer 2, thereby adhering the protection film 105 onto the display element layer 102. Then, a predetermined bubble elimination process is carried out again to eliminate the bubbles remaining between the protection film 105 and the display element layer 102.

Next, as shown in FIGS. 4A and 4B, a sealing material 110 is coated to have a belt-like shape around the entire periphery of the layered structure formed by the display element layer 102 and the protection film 105, thereby covering and sealing the whole side faces of the layered structure with the material 110. As the sealing material 110, an ultraviolet (UV) ray curing resin is preferably used. Spacers (not shown) in the form of minute particles are mixed and dispersed in the material 110. This is to facilitate the formation of the sealing material 110 having a desired height.

Subsequently, the entire sealing material 110 is irradiated with UV rays for curing. As a result, the sealing material 110 is turned to the sealing member 104 that has a rectangular ring-like plan shape and that seals the whole side faces of the layered structure formed by the display element layer 102 and the protection film 112. In this way, the prior-art electrophoretic display device 150 shown in FIGS. 1A and 1B is fabricated.

FIG. 5 is a schematic cross-sectional view showing an example of the internal structure of the bistable electrophoretic display element layer 102, where bistable electrophoretic display elements are of the microcapsule type.

As shown in FIG. 5, the electrophoretic display element layer 102 comprises an electronic ink layer 102a in which bistable electrophoretic display elements 102aa are uniformly dispersed, a common electrode 102b, and a transparent resin film 102c. The common electrode 102b is formed to entirely cover a main surface of the film 102c. The electronic ink layer 102a is formed to cover the whole surface of the common electrode 102b and therefore, the display elements 102aa are arranged over the whole surface of the electronic ink layer 102. The adhesive 103 is coated on the opposite main surface (back surface) of the electronic ink layer 102 to the film 102c.

In addition, there are Patent Document 1 (Japanese Non-Examined Patent Publication No. 2005-309075) and Patent Document 2 (Japanese Non-Examined Patent Publication No. 2005-114820) as the prior-art references relating to the present invention.

The Patent Document 1 discloses an electronic ink display device and a method of fabricating the same. This device comprises a first substrate (TFT substrate) having display pixels; a second substrate formed on the first substrate, which has at least an electronic ink layer; and a protection substrate formed on the second substrate. The protection substrate is larger than the second substrate and is expanded from the second substrate. A sealing material is filled in the space between the first substrate and the protection substrate expanding from the second substrate (see claim 1 and paragraph 0006).

With this electronic ink display device of the Patent Document 1, the weakness of the mechanical strength of the overall electronic ink display device can be eliminated by the protection substrate and at the same time, the weakness of the electronic ink layer in the moisture resistance can be eliminated by the sealing material. In other words, a panel structure having improved mechanical strength and improved moisture resistance is obtainable (see paragraph 0007 and 0011 and FIGS. 1 and 2).

The Patent Document 2 discloses a microcapsule type electrophoretic display panel and a method of fabricating the same. This panel comprises a substrate (TFT substrate); a microcapsule display layer disposed on the substrate; a transparent resin film formed to cover the microcapsule display layer; and a transparent resin protection film formed to cover the transparent resin film. The transparent resin protection film protrudes laterally from a side face of the transparent resin film, and has a size larger than the transparent resin film in such a way as to form a gap between the transparent resin protection film and the substrate in the peripheries of the microcapsule display layer and the transparent resin film. A water-vapor shielding resin layer is filled in the gap (see claim 1 and paragraphs 0008 to 0009).

With the microcapsule type electrophoretic display panel of the Patent Document 2, the above-described gap is filled with the water-vapor shielding resin layer and therefore, the entry of moisture to the microcapsule display layer can be effectively prevented. This means that the characteristics of the microcapsule display layer can be effectively prevented from degrading. Moreover, since the protection function for the microcapsule display layer is significantly enhanced by the transparent resin protection film, the breakage of the microcapsule display layer due to external shock can be effectively avoided (see paragraphs 0010, 0011 and 0017 and FIG. 1).

By the way, with the above-described prior-art electrophoretic display device 150 shown in FIGS. 1A and 1B, the following display defects may occur:

The first display defect is blotches or smears appearing on the display screen. According to the inventor's research, it was found that the cause of this defect is moisture and/or air bubbles entered to the inside of the bistable electrophoretic display element layer 102. Specifically, a very small quantity of moisture and/or air bubbles exist in the gap between the display element layer 102 and the protection film 105, or in the gap between the sealing member 104 and the display element layer 102 and the protection film 105. The said moisture and/or air bubbles will enter the inside of the display element layer 102 during the fabrication process sequence, causing the first display defect.

The second display defect is that images are not displayed on the screen as desired even if the TFTs are driven, i.e., defective driving. Specifically, even if a predetermined voltage is applied across the driving electrodes on the TFT substrate 101 and the common electrode 102b of the display element layer 102 by driving the TFTs, the minute particles existing in the display elements 102aa will not be moved as intended and as a result, desired images will not be displayed on the screen. According to the inventor's research, it was found that the cause of this defect is moisture and/or air bubbles entered to the boundary between the TFT substrate 101 and the bistable electrophoretic display element layer 102. Specifically, a very small quantity of moisture and/or air bubbles remain in the gaps between the display element layer 102 and the protection film 105, between the sealing member 104 and the protection film 105, and between the sealing member 104 and the display element layer 102. The said moisture and/or air bubbles will enter the boundary between the TFT substrate 101 and the display element layer 102 during the fabrication process sequence, forming a narrow space between the TFT substrate 101 and the display element layer 102. Due to this narrow space, the second display defect will occur.

SUMMARY OF THE INVENTION

The present invention was created in consideration of the above-described findings and its object is to provide an electrophoretic display device that makes it possible to prevent the above-described first and second display defects (i.e., blotches or smears on the display screen and defective driving) with reliability, and a method of fabricating the device.

Another object of the present invention is to provide an electrophoretic display device that realizes high image quality and high reliability simultaneously, and a method of fabricating the device.

The above objects together with others not specifically mentioned will become clear to those skilled in the art from the following description.

Here, the above-described electronic ink display device disclosed by the Patent Document 1 and the above-described microcapsule type electrophoretic display panel disclosed by the Patent Document 2 are different from the present invention as follows:

With the electronic ink display device of the Patent Document 1 and the microcapsule type electrophoretic display panel of by the Patent Document 2, the entering of moisture to the electronic ink layer or the microcapsule display layer from the outside is prevented. This is to avoid the characteristic degradation due to moisture appearing after the fabrication (i.e., during the use) of the said device or panel, not during the fabrication process sequence thereof. Accordingly, the causes of the characteristic degradation in the device of the Patent Document 1 and the panel of the Patent Document 2 are different from those of the above-described first and second display defects in the prior-art device 150, although the basic structures of the device of the Patent Document 1 and the panel of the Patent Document 2 are approximately the same as the prior-art electrophoretic display device 150. Since the present invention is intended to prevent the above-described first and second display defects in the prior-art device 150, the electrophoretic display device and the fabrication method thereof according to the present invention are different from the device and its fabrication method of the Patent Document 1 and the panel and its fabrication method of the Patent Document 2 in this point.

According to the first aspect of the present invention, an electrophoretic display device is provided, which comprises:

a first substrate having switching elements and driving electrodes;

an electrophoretic display element layer fixed on a predetermined display region of the first substrate;

a sealing member formed to surround the display element layer on the first substrate, the sealing member being thicker than the display element layer; and a second substrate fixed on an opposite end of the sealing member to the first substrate, the second substrate having a wider area than the display element layer;

wherein the first substrate, the sealing member, and the second substrate constitute a closed inner space around the display element layer, thereby enclosing the display element layer in the space; and the space is filled with an inert gas having a pressure approximately equal to an atmospheric pressure or is set in a predetermined vacuum state.

With the electrophoretic display device according to the first aspect of the present invention, since the above-described structure is employed, the inside of the inner space needs to be evacuated or degassed before an inert gas is introduced into the space or a predetermined vacuum state is generated in the space. Thus, air and moisture existing in the space will be removed in the above evacuation or degassing process. Accordingly, the first display defect (i.e., blotches or smears on the display screen), which is caused by the fact that a very small quantity of moisture and/or air bubbles existing in the vicinity of the electrophoretic display element layer enter the inside of the said layer during the fabrication process sequence, and the second display defect (i.e., defective driving), which is caused by the fact that the said moisture and/or air bubbles enter the boundary between the first substrate and the electrophoretic display element layer during the fabrication process sequence, can be prevented with reliability.

Moreover, since the first and second display defects are prevented reliably, higher display quality than the above-described prior-art electrophoretic display device 150 is obtained.

Furthermore, the electrophoretic display element layer is enclosed in the sealed inner space that is filled with an inert gas whose pressure is approximately equal to an atmospheric pressure or that is set in a predetermined vacuum state. Therefore, the moisture and air existing outside (i.e., in the atmospheric air) can be surely cut off from the electrophoretic display element layer. This means that the moisture and air existing outside (in the atmospheric air) will not enter the inner space during the use of the electrophoretic display device according to the first aspect. As a result, not only higher display quality but also higher reliability than the above-described prior-art electrophoretic display device 150 are obtainable.

In a preferred embodiment of the device according to the first aspect of the invention, a gap is formed between the second substrate and the electrophoretic display element layer to separate the second substrate from the electrophoretic display element layer. In this embodiment, there are additional advantages that the electrophoretic display element layer is not affected by shock or the like applied to the second substrate, that the count of required fabrication process steps is decreased because the step of placing spacers in the gap is unnecessary, and that the fabrication cost is lowered.

In another preferred embodiment of the device according to the first aspect of the invention, a gap is formed between the second substrate and the electrophoretic display element layer, and spacers are arranged in the gap. In this embodiment, there are additional advantages that the adhesion or cohesion of the electrophoretic display element layer to the first substrate is raised because the electrophoretic display element layer is pressed to the first substrate by the second substrate, and that the obtainable image quality is improved further because the uniformity of the gap is maintained by the spacers, although the count of required fabrication process steps is increased.

In still another preferred embodiment of the device according to the first aspect of the invention, the sealing member has an opening that allows access to the electrophoretic display element layer enclosed in the space, the opening being closed by a closing member. In this embodiment, there are additional advantages that bubbles and/or moisture existing in the space can be removed easily, and that the incorporation of an inert gas into the space or the generation of a vacuum state in the space can be realized easily, because a gas can be flowed into the space or flowed therefrom by way of the opening.

In this embodiment, it is preferred that part of the closing member is drawn in the space by way of the opening. This is because the opening can be easily closed or sealed with high hermeticity by applying a closing material to the sealing member to cover the opening from the outside and pressing mechanically the closing material with the use of the pressure difference between the inside and outside of the space.

Furthermore, in this embodiment, it is preferred that the closing member for closing the opening is made of a same material (e.g., UV curing resin, thermosetting resin, or the like) as the sealing member. This is because the closing member can be formed in the same way as that of the sealing member.

In a further preferred embodiment of the device according to the first aspect of the invention, the sealing member has a closed shape in such a way as to surround the electrophoretic display element layer. In this embodiment, the sealing member does not have an opening and therefore, a gas is unable to be flowed into the space or flowed therefrom by way of the opening. However, the removal of bubbles and/or air existing in the space, and the incorporation of an inert gas into the space, or the generation of a vacuum state in the space can be realized by, for example, fixing the second substrate to the sealing member in an inert gas atmosphere or a vacuum atmosphere. Moreover, since the sealing member does not have an opening, the step of closing the opening is unnecessary. Therefore, there is an additional advantage that the count of necessary fabrication process steps is decreased and thus, the fabrication cost is lowered.

According to a second aspect of the present invention, a method of fabricating an electrophoretic display device is provided, which comprises the steps of:

preparing a first substrate having switching elements and driving electrodes;

fixing an electrophoretic display element layer on a predetermined display region of the first substrate;

forming, on the first substrate, a sealing member that surrounds the display element layer and that is thicker than the display element layer;

fixing a second substrate having a wider area than the display element layer on an opposite end of the sealing member to the first substrate to constitute a closed inner space by the first substrate, the sealing member, and the second substrate around the display element layer, thereby enclosing the display element layer in the space; and filling the space with an inert gas having a pressure approximately equal to an atmospheric pressure or setting a predetermined vacuum state in the space.

With the method of fabricating a electrophoretic display device according to the second aspect of the present invention, since the above-described process steps are included, it is obvious that the above-described electrophoretic display device according to the first aspect of the invention can be fabricated.

Moreover, this method includes the step of filling the inner space with an inert gas having a pressure approximately equal to an atmospheric pressure or the step of setting a predetermined vacuum state in the inner space and therefore, the inside of the space needs to be evacuated or degassed before the said step. Thus, the air and moisture existing in the space will be removed. Accordingly, the first display defect (i.e., blotches or smears on the display screen), which is caused by the fact that a very small quantity of moisture and/or air bubbles existing in the vicinity of the electrophoretic display element layer enter the inside of the said layer during the fabrication process sequence, and the second display defect (i.e., defective driving), which is caused by the fact that the said moisture and/or air bubbles enter the boundary between the first substrate and the electrophoretic display element layer during the fabrication process sequence, can be prevented with reliability.

Since the first and second display defects are prevented reliably, higher display quality than the above-described prior-art electrophoretic display device 150 is obtained.

Furthermore, this method includes the step of enclosing the electrophoretic display element layer in the sealed inner space and the step of filling the space with an inert gas whose pressure is approximately equal to an atmospheric pressure or of setting a predetermined vacuum state in the space. Thus, the moisture and air existing outside (i.e., in the atmospheric air) can be surely cut off from the electrophoretic display element layer. This means that the moisture and air existing outside (in the atmospheric air) will not enter the space during the use of the electrophoretic display device thus fabricated. As a result, not only higher display quality but also higher reliability than the above-described prior-art electrophoretic display device 150 are obtainable.

In a preferred embodiment of the method according to the second aspect of the invention, in the step of fixing the second substrate on the opposite end of the sealing member to the first substrate to constitute the closed inner space, a gap is formed between the second substrate and the electrophoretic display element layer to separate the second substrate from the electrophoretic display element layer. In this embodiment, there are additional advantages that the electrophoretic display element layer is not affected by shock or the like applied to the second substrate, that the count of required fabrication process steps is decreased because the step of placing spacers in the gap is unnecessary, and that the fabrication cost is lowered.

In another preferred embodiment of the method according to the second aspect of the invention, in the step of fixing the second substrate on the opposite end of the sealing member to the first substrate to constitute the closed inner space, a gap is formed between the second substrate and the electrophoretic display element layer, and spacers are arranged in the gap in a later step. In this embodiment, there are additional advantages that the adhesion or cohesion of the electrophoretic display element layer to the first substrate is raised because the electrophoretic display element layer is pressed to the first substrate by the second substrate, and that the obtainable image quality is improved further because the uniformity of the gap is maintained by the spacers, although the count of required fabrication process steps is increased.

In still another preferred embodiment of the method according to the second aspect of the invention, in the step of forming the sealing member, an opening that allows access to the electrophoretic display element layer enclosed in the space is formed; and the opening is closed by a closing member in a later step. In this embodiment, there are additional advantages that bubbles and/or moisture existing in the space can be removed easily, and that the incorporation of an inert gas into the space, or the generation of a vacuum state in the space can be realized easily, because a gas can be flowed into the space or flowed therefrom by way of the opening.

In this embodiment, it is preferred that in the step of closing the opening by the closing member, a closing material is applied to the sealing member to cover the opening from the outside and thereafter, the opening is closed by the closing material with the use of the pressure difference between the inside and outside of the inner space. In this case, there is an additional advantage that the opening can be closed easily with high hermeticity by confirming that part of the closing material has been drawn in the space by way of the opening.

Furthermore, in this embodiment, it is preferred that the closing member for closing the opening is made of a same material (e.g., UV curing resin, thermosetting resin or the like) as the sealing member. This is because the closing member can be formed in the same way as the sealing member.

In a further preferred embodiment of the method according to the second aspect of the invention, in the step of forming the sealing member, the sealing member is formed to have a closed shape in such a way as to surround the electrophoretic display element layer. In this embodiment, the sealing member does not have an opening and therefore, a gas is unable to be flowed in the space or flowed therefrom by way of an opening. However, the removal of bubbles and/or air existing in the space, and the incorporation of an inert gas into the space, or the generation of a vacuum state in the space can be realized by, for example, fixing the second substrate to the sealing member in an inert gas atmosphere or a vacuum atmosphere. Moreover, since the sealing member does not have an opening, the step of closing the opening is unnecessary. As a result, there is an additional advantage that the count of necessary fabrication process steps is decreased and thus, the fabrication cost is lowered.

In a still further preferred embodiment of the method according to the second aspect of the invention, the step of fixing the electrophoretic display element layer on the first substrate, the step of forming the sealing member on the first substrate, the step of fixing the second substrate on the opposite end of the sealing member to the first substrate to constitute the inner space, and the step of filling the space with the inert gas having the pressure approximately equal to the atmospheric pressure or setting the predetermined vacuum state in the space are carried out in an inert gas atmosphere. In this embodiment, there is an additional advantage that the space can be easily filled with the inert gas even if the sealing member does not have an opening.

In a still further preferred embodiment of the method according to the second aspect of the invention, the step of filling the space with the inert gas having the pressure approximately equal to the atmospheric pressure or setting the predetermined vacuum state in the space is carried out in a vacuum atmosphere. In this embodiment, there is an additional advantage that air and moisture existing in the space are reliably removed simultaneously with the step of evacuation or degassing of the space.

As the inert gas used in the electrophoretic display device according to the first aspect of the present invention and the method of fabricating an electrophoretic display device according to the second aspect of the present invention, any chemically inert gas may be used. However, it is preferred that nitrogen gas is used as the inert gas. Any one of rare gases such as argon (Ar) may be used for this purpose.

BRIEF DESCRIPTION OF THE DRAWINGS

In order that the present invention may be readily carried into effect, it will now be described with reference to the accompanying drawings.

FIG. 5 is a schematic cross-sectional view showing an example of the internal structure of the prior-art electrophoretic display device of FIGS. 1A and 1B, where the electrophoretic display elements are of the microcapsule type.

FIG. 6A is a plan view showing the schematic structure of an electrophoretic display device according a first embodiment of the invention, and FIG. 6B is a cross-sectional view along the line VIB-VIB in FIG. 6A.

FIG. 7A is a plan view showing a method of fabricating the electrophoretic display device according the first embodiment of the invention, and FIG. 7B is a cross-sectional view thereof along the line VIB-VIB in FIG. 6A.

FIG. 8A is a plan view showing the method of fabricating the electrophoretic display device according the first embodiment of the invention, and FIG. 8B is a cross-sectional thereof view along the line VIB-VIB in FIG. 6A, which are subsequent to the step of FIGS. 7A and 7B.

FIG. 9A is a plan view showing the method of fabricating the electrophoretic display device according the first embodiment of the invention, and FIG. 9B is a cross-sectional view thereof along the line VIB-VIB in FIG. 6A, which are subsequent to the step of FIGS. 8A and 8B.

FIG. 10A is a plan view showing the method of fabricating the electrophoretic display device according the first embodiment of the invention, and FIG. 10B is a cross-sectional view thereof along the line VIB-VIB in FIG. 6A, which are subsequent to the step of FIGS. 9A and 9B.

FIG. 11A is a plan view showing the method of fabricating the electrophoretic display device according the first embodiment of the invention, and FIG. 11B is a cross-sectional view thereof along the line VIB-VIB in FIG. 6A, which are subsequent to the step of FIGS. 10A and 10B.

FIG. 12A is a plan view showing the method of fabricating the electrophoretic display device according the first embodiment of the invention, and FIG. 12B is a cross-sectional view thereof along the line VIB-VIB in FIG. 6A, which are subsequent to the step of FIGS. 11A and 11B.

FIG. 13A is a plan view showing the method of fabricating the electrophoretic display device according the first embodiment of the invention, and FIG. 13B is a cross-sectional view thereof along the line VIB-VIB in FIG. 6A, which are subsequent to the step of FIGS. 12A and 12B.

FIG. 14A is a plan view showing the method of fabricating the electrophoretic display device according the first embodiment of the invention, and FIG. 14B is a cross-sectional view thereof along the line VIB-VIB in FIG. 6A, which are subsequent to the step of FIGS. 13A and 13B.

FIG. 15A is a plan view showing the schematic structure of an electrophoretic display device according a second embodiment of the invention, and FIG. 15B is a cross-sectional view thereof along the line XVB-XVB in FIG. 15A.

FIG. 16A is a plan view showing a method of fabricating the electrophoretic display device according the second embodiment of the invention, and FIG. 16B is a cross-sectional view thereof along the line XVB-XVB in FIG. 15A.

FIG. 17A is a plan view showing the method of fabricating the electrophoretic display device according the second embodiment of the invention, and FIG. 17B is a cross-sectional view thereof along the line XVB-XVB in FIG. 15A, which are subsequent to the step of FIGS. 16A and 16B.

FIG. 18A is a plan view showing the method of fabricating the electrophoretic display device according the second embodiment of the invention, and FIG. 18B is a cross-sectional view thereof along the line XVB-XVB in FIG. 15A, which are subsequent to the step of FIGS. 17A and 17B.

FIG. 19A is a plan view showing the method of fabricating the electrophoretic display device according the second embodiment of the invention, and FIG. 19B is a cross-sectional view thereof along the line XVB-XVB in FIG. 15A, which are subsequent to the step of FIGS. 18A and 18B.

FIG. 20A is a plan view showing the schematic structure of an electrophoretic display device according a third embodiment of the invention, and FIG. 20B is a cross-sectional view thereof along the line XXB-XXB in FIG. 20A.

FIG. 21A is a plan view showing a method of fabricating the electrophoretic display device according the third embodiment of the invention, and FIG. 21B is a cross-sectional view thereof along the line XXB-XXB in FIG. 20A.

FIG. 22A is a plan view showing the method of fabricating the electrophoretic display device according the third embodiment of the invention, and FIG. 22B is a cross-sectional view thereof along the line XXB-XXB in FIG. 20A, which are subsequent to the step of FIGS. 21A and 21B.

FIG. 23A is a plan view showing the method of fabricating the electrophoretic display device according the third embodiment of the invention, and FIG. 23B is a cross-sectional view thereof along the line XXB-XXB in FIG. 20A, which are subsequent to the step of FIGS. 22A and 22B.

FIG. 24A is a plan view showing the method of fabricating the electrophoretic display device according the third embodiment of the invention, and FIG. 24B is a cross-sectional view thereof along the line XXB-XXB in FIG. 20A, which are subsequent to the step of FIGS. 23A and 23B.

FIG. 25A is a plan view showing the method of fabricating the electrophoretic display device according the third embodiment of the invention, and FIG. 25B is a cross-sectional view thereof along the line XXB-XXB in FIG. 20A, which are subsequent to the step of FIGS. 24A and 24B.

FIG. 26A is a plan view showing the method of fabricating the electrophoretic display device according the third embodiment of the invention, and FIG. 26B is a cross-sectional view thereof along the line XXB-XXB in FIG. 20A, which are subsequent to the step of FIGS. 25A and 25B.

FIG. 27A is a plan view showing the method of fabricating the electrophoretic display device according the third embodiment of the invention, and FIG. 27B is a cross-sectional view thereof along the line XXB-XXB in FIG. 20A, which are subsequent to the step of FIGS. 26A and 26B.

DETAILED DESCRIPTION OF THE PREFERRED EMBODIMENTS

Figure 1A:
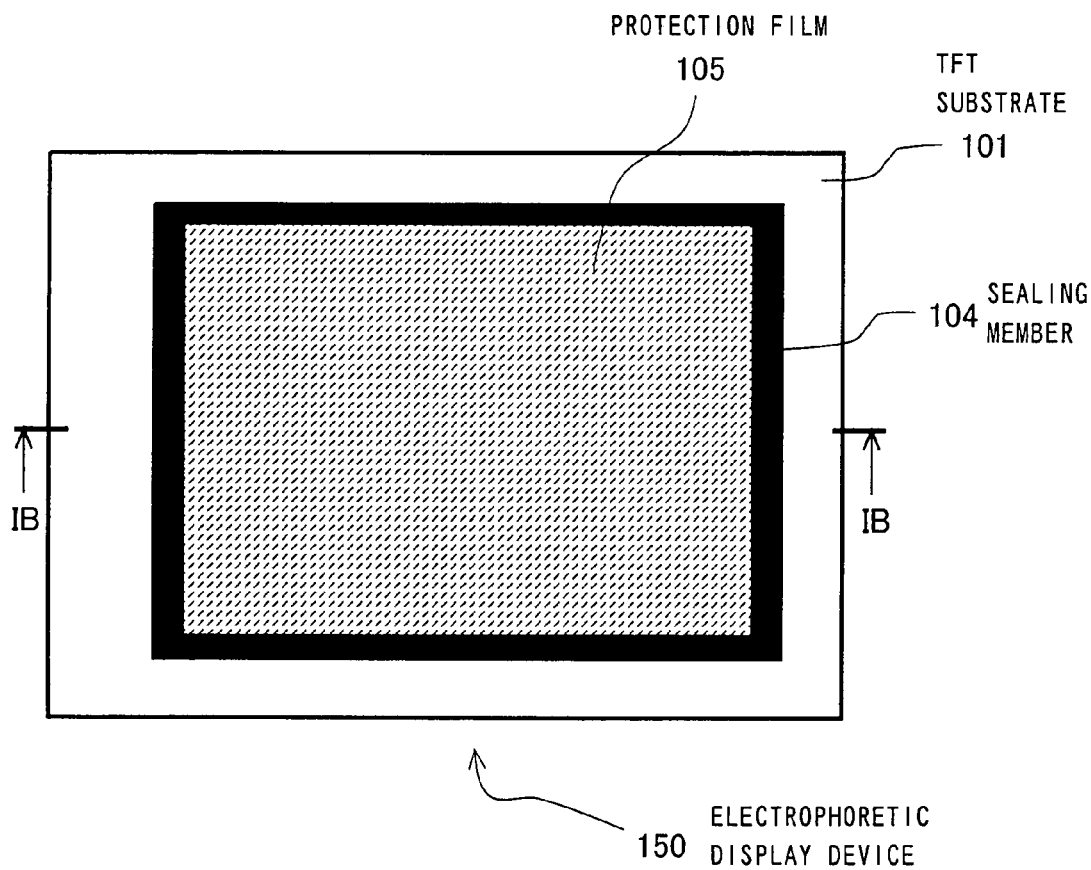
FIG. 1A is a plan view showing the schematic structure of a prior-art electrophoretic display device.
Figure 1B:
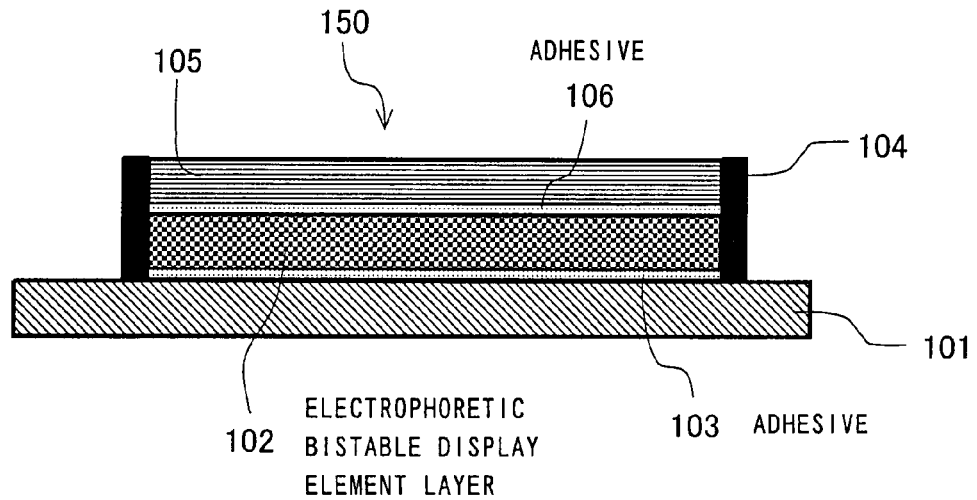
FIG. 1B is a cross-sectional view along the line IB-IB in FIG. 1A.
Figure 2A:
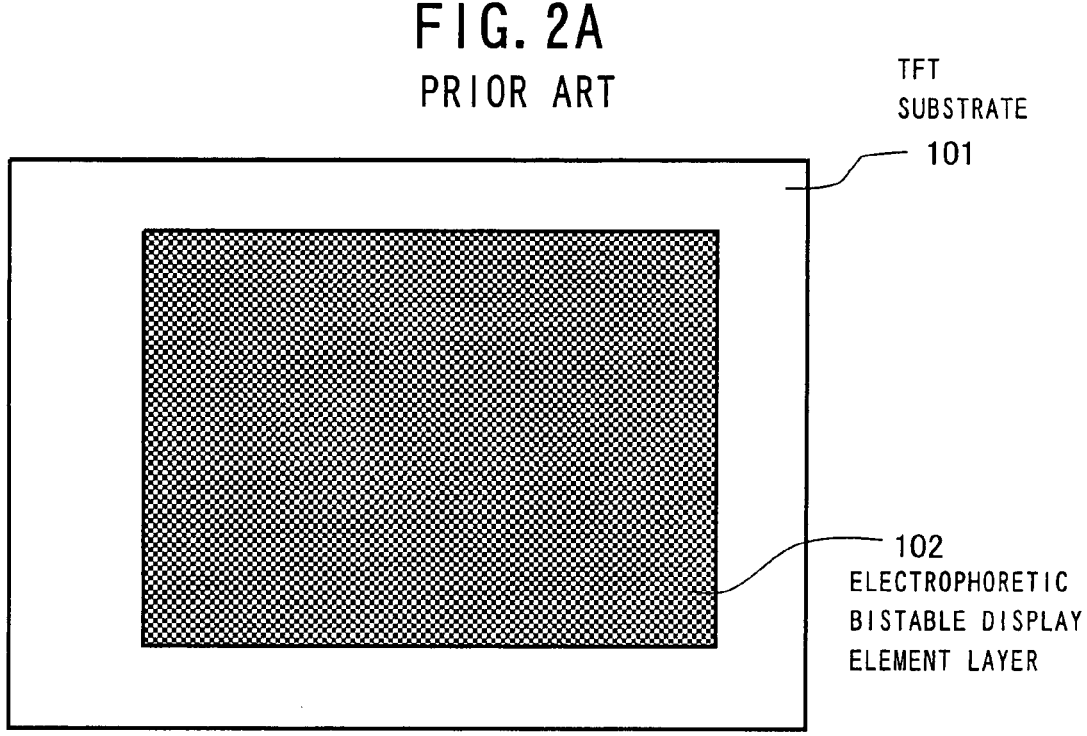
FIG. 2A is a plan view showing a method of fabricating the prior-art electrophoretic display device of FIGS. 1A and 1B.
Figure 2B:
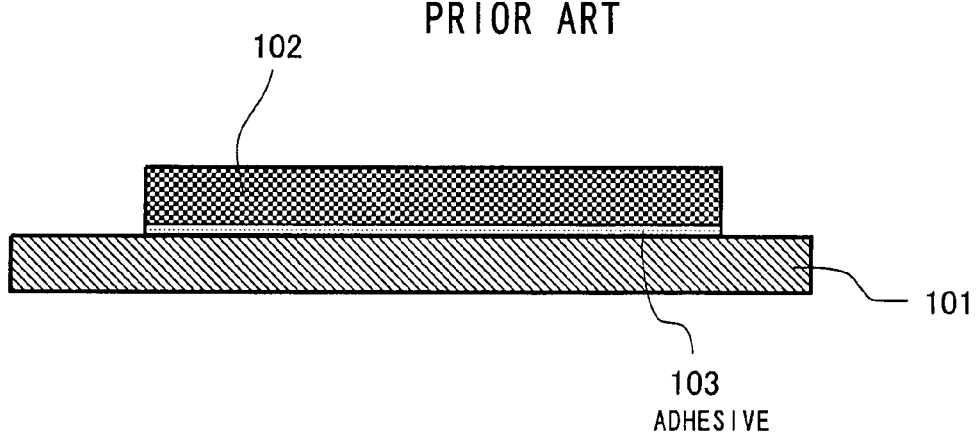
FIG. 2B is a cross-sectional view along the line IB-IB in FIG. 1A.
Figure 3A:
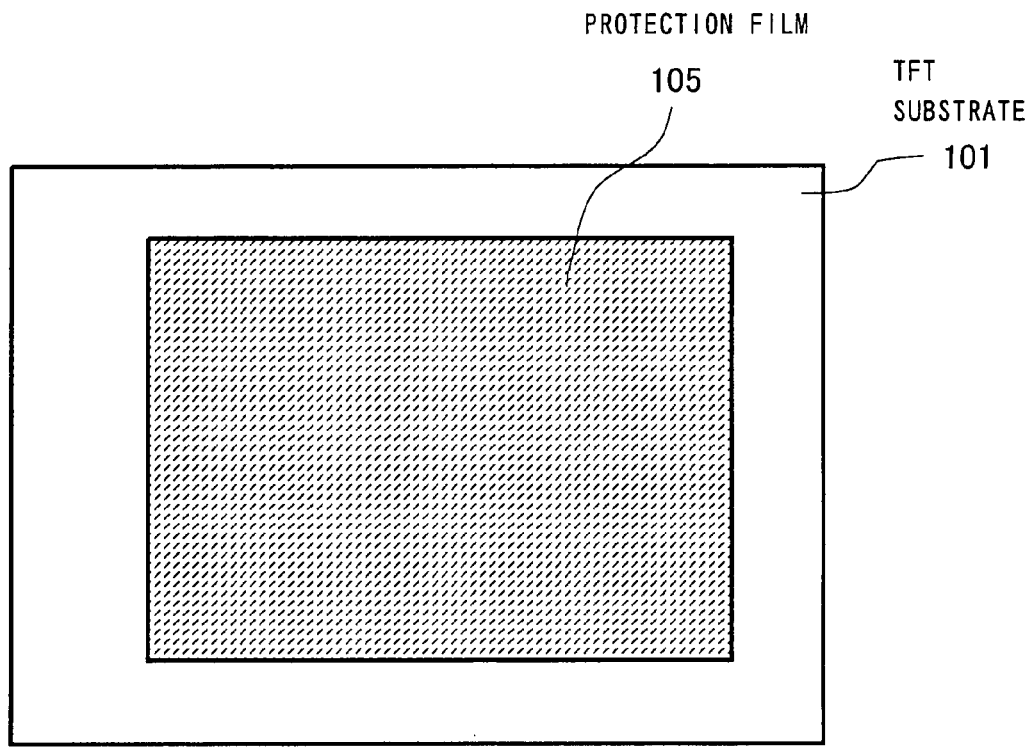
FIG. 3A is a plan view showing the method of fabricating the prior-art electrophoretic display device of FIGS. 1A and 1B.
Figure 3B:
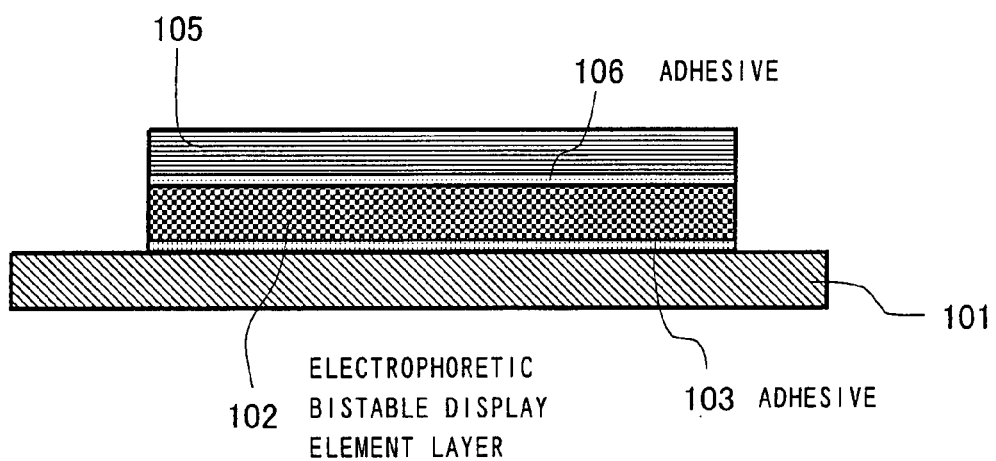
FIG. 3B is a cross-sectional view thereof along the line IB-IB in FIG. 1A, which are subsequent to the step of FIGS. 2A and 2B.
Figure 4A:
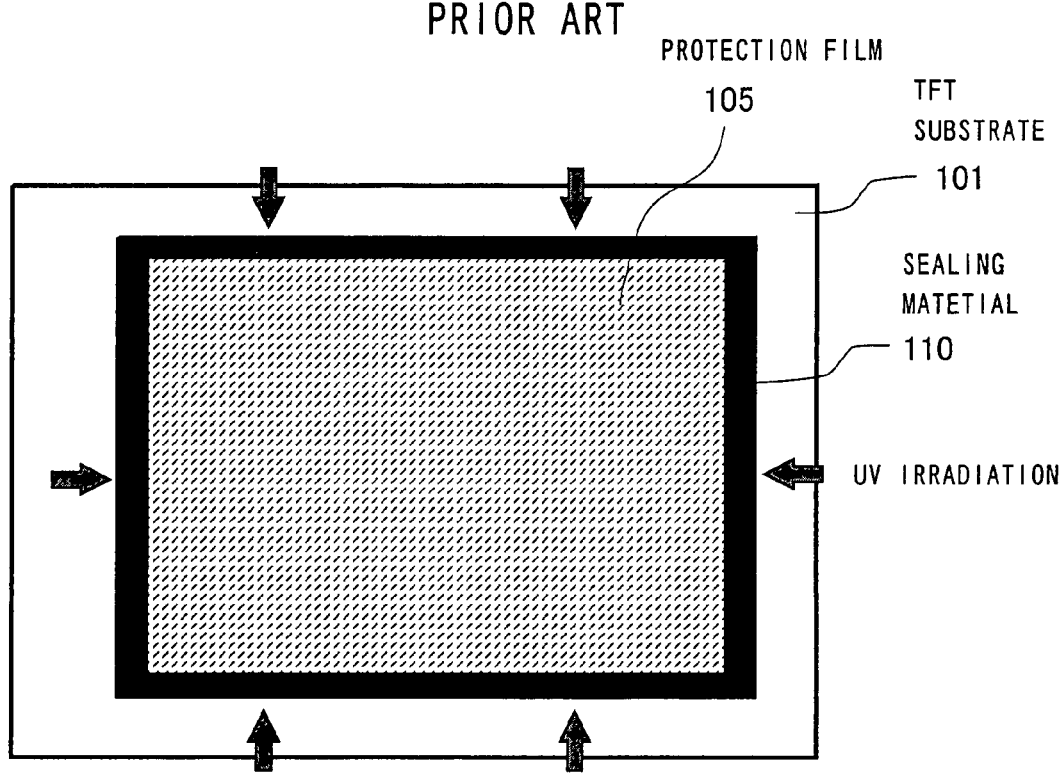
FIG. 4A is a plan view showing the method of fabricating the prior-art electrophoretic display device of FIGS. 1A and 1B.
Figure 4:
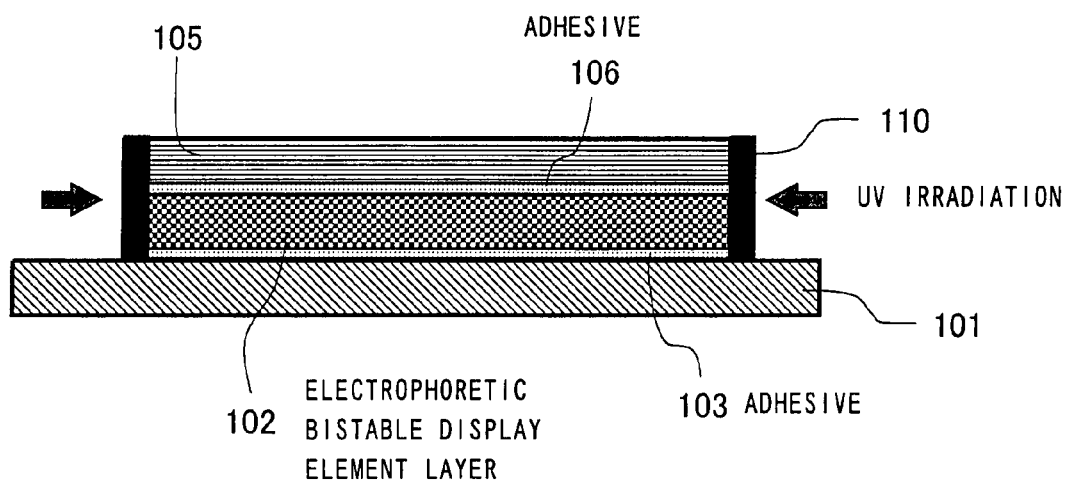
FIG. 4B is a cross-sectional view thereof along the line IB-IB in FIG. 1A, which are subsequent to the step of FIGS. 3A and 3B.

Preferred embodiments of the present invention will be described in detail below while referring to the drawings attached.

First Embodiment

The schematic structure of an electrophoretic display device 50 according to a first embodiment of the invention is shown in FIGS. 6A and 6B.

The electrophoretic display device 50 according to the first embodiment comprises a TFT substrate 1, a bistable electrophoretic display element layer 2 fixed on the predetermined display region of the TFT substrate 1, an annular sealing member 4 formed on the TFT substrate 1 to surround the electrophoretic display element layer 2, and a transparent glass substrate 6 fixed on the opposite end of the sealing member 4 to the TFT substrate 1. The TFT substrate 1 has a plurality of TFTs and predetermined driving electrodes (both not shown) formed in the display region. The TFTs and the driving electrodes are arranged in a matrix array. The sealing member 4 is thicker or higher than the display element layer 2. The glass substrate 6 has a wider area than that of the display element layer 2. The display element layer 2 is fixed to the TFT substrate 1 with a sheet-shaped adhesive 3 coated on the back surface (i.e., the main surface on the same side as the TFT substrate 1) of the display element layer 2. The glass substrate 6 is provided to protect the display element layer 2.

As seen from FIG. 6A, each of the TFT substrate 1, the display element layer 2, and the glass substrate 6 has an approximately rectangular plan shape. The display element layer 2 is smaller in area than the TFT substrate 1. The glass substrate 6 is smaller in area than the TFT substrate 1 but larger in area than the display element layer 2. The sealing member 4, which is extended linearly along the side faces of the display element layer 2, has a rectangular ring-shaped plan shape whose corners are rounded. The sealing member 4 has an opening 11 allowing the access to the inside of the sealing member 4 at a position opposing to one of the side faces of the display element layer 2. The opening 11 is sealed by a closing member 8, which is attached to the sealing member 4 to cover the opening 11 from its outside. Spacers 12 in the shape of minute particle are incorporated and dispersed in the sealing member 4. The spacers 12 are provided to facilitate the formation of the sealing member 4 with a desired height or thickness.

The TFT and glass substrates 1 and 6 and the sealing member 4 interconnecting the substrates 1 and 6 form or define a closed inner space or cavity 7. The display element layer 2 is placed in the space 7. In other words, the TFT and glass substrates 1 and 6 and the sealing member 4 constitute a casing for having the display element layer 2 built-in and for protecting the same. Therefore, it may be said that the display element layer 2 is enclosed in the inner space 7 or casing. The reason why the display element layer 2 is enclosed in the space or cavity 7 is to protect the display element layer 2 against shocks or the like and to prevent the moisture existing in the air and the air itself from entering the inside of the display element layer 2. Specifically, the entering of the moisture and air to the inside of the display element layer 2 from the side of the TFT substrate 1 (i.e., the back of the display element layer 2) is prevented by the TFT substrate 1. The entering of the moisture and air to the inside of the display element layer 2 from the opposite side to the TFT substrate 1 (i.e., the front of the display element layer 2) is prevented by the glass substrate 6. The entering of the moisture and air to the inside of the display element layer 2 from the side faces of the said layer 2 is prevented by the sealing member 4.

The inner space 7 is filled with nitrogen ($N_2$) gas having a pressure approximately equal to the atmospheric pressure. Because of this nitrogen gas, the moisture and/or air existing in the outside (i.e., in the atmosphere) will not enter the space 7 and as a result, the said moisture and/or air can be cut off from the space 7 with reliability.

The TFT substrate 1 and the glass substrate 6 constitute the lower wall (i.e., bottom) and the upper wall (i.e., top or lid) that define the inner space 7, respectively. The sealing member 4 constitutes the sidewall that defines the space 7. In the space 7, the display element layer 2 is apart from the sealing member 4 and the glass substrate 6.

The height or thickness of the sealing member 4 is set to be greater than that of the display element layer 2, as seen from FIG. 6B. Thus, the glass substrate 6 fixed to the top end of the sealing member 4 (i.e., the opposite end to the TFT substrate 1) and the display element layer 2 positioned below the glass substrate 6 are apart from each other. For this reason, a gap 10 is generated between the upper main surface of the display element layer 2 and the lower main surface (i.e., the inner surface) of the glass substrate 6. In the gap 10 thus generated, spherical spacers 5 are placed and dispersed. Therefore, it may be said that the middle part of the glass plate 6, which is above the display element layer 2, is mechanically supported by the display element layer 2 via the spacers 5, and the peripheral part thereof is mechanically supported by the sealing member 4. Accordingly, no flexure occurs in the glass plate 6 itself and at the same time, the gap 10 between the glass plate 6 and the display element layer 2 is maintained at a desired magnitude or value with high uniformity. In addition, the height or thickness of the sealing member 4 is determined such that the gap 10 has a predetermined value.

Although the uniformity of the gap 10 and the adhesion of the display element layer 2 to the TFT substrate 1 deteriorate, the spacers 5 may be omitted, if reduction of the fabrication process steps (i.e., the fabrication cost) is considered more important.

When the electrophoretic display device 50 according to the first embodiment is used, viewers will see the characters and images displayed on the display element layer 2 from the same side as the transparent (light-transmissive) glass substrate 6 (from the upper side in FIG. 6B).

The inner structure of the display element layer 2 may be, for example, the same as that shown in FIG. 5. Thus, the explanation about the said inner structure is omitted here.

As described above, the electrophoretic display device 50 according to the first embodiment comprises the TFT substrate 1 (which corresponds to the first substrate) having the TFTs as switching elements and the driving electrodes, the electrophoretic display element layer 2 fixed on the predetermined display region of the TFT substrate 1, the annular sealing member 4 that surrounds the display element layer 2 on the TFT substrate 1 and that is formed to be higher than the display element layer 2, and the glass substrate 6 (which corresponds to the second substrate) that has a wider area than the display element layer 2 and that is fixed on the opposite end of the sealing member 4 to the TFT substrate 1. The TFT substrate 1, the sealing member 4, and the glass substrate 6 constitute the closed inner space or cavity 7 around the display element layer 2, thereby enclosing the display element layer 2 in the space 7. The space 7 is filled with nitrogen gas having a pressure approximately equal to the atmospheric pressure.

Since the inside of the space 7 needs to be evacuated or degassed before nitrogen gas is introduced, the air and moisture existing in the space 7 are removed in the step of evacuation or degassing step. Therefore, the first display defect (i.e., blotches or smears on the display screen), which is caused by the fact that a very small quantity of moisture and/or air bubbles existing in the vicinity of the electrophoretic display element layer 2 enter the inside of the said layer 2 during the fabrication process sequence, and the second display defect (i.e., defective driving), which is caused by the fact that the said moisture and/or air bubbles enter the boundary between the TFT substrate 1 and the display element layer 2, can be prevented with reliability.

Moreover, since the display element layer 2 is pressed toward the TFT substrate 1 by the glass substrate 6, the adhesion of the display element layer 2 to the TFT substrate 1 is increased. The uniformity of the gap 10 between the glass substrate 6 and the display element layer 2 is maintained by the spacers 5. Therefore, in addition to the reliable prevention of the first and second display defects explained as above, higher display quality than the above-described prior-art electrophoretic display device 150 is obtained.

Furthermore, the display element layer 2 is enclosed in the sealed inner space 7, which is filled with nitrogen gas whose pressure is approximately equal to the atmospheric pressure. Thus, the moisture and air existing outside (i.e., in the atmosphere) can be surely cut off. This means that the moisture and air existing outside (in the atmosphere) will not enter the space 7 during the use of the electrophoretic display device 50 according to the first embodiment. As a result, not only higher display quality but also higher reliability than the above-described prior-art electrophoretic display device 150 are obtainable.

Next, a method of fabricating the electrophoretic display device 50 according to the first embodiment is explained below with reference to FIGS. 7A and 7B to FIGS. 14A and 14B.

First, as shown in FIGS. 7A and 7B, the bistable electrophoretic display element layer 2 having the sheet-shaped adhesive 3 on its back surface is heated to a predetermined temperature, softening the said adhesive 3. Then, the display element layer 2 is placed on the display region of the TFT substrate 1 while conducting the positional alignment of the display element layer 2, and the said layer 2 is pressed. In this way, the display element layer 2 is adhered and fixed to the display region of the TFT substrate 1. Thereafter, a predetermined bubble elimination process (which is known) is carried out, thereby eliminating the bubbles remaining between the display element layer 2 and the TFT substrate 1.

Next, as shown in FIGS. 8A and 8B, by using a known dispenser or by a printing method, a sealing material 20 is formed to have a belt-like shape so as to surround the display element layer 2. In this step, an opening or window 21 is formed to penetrate through the sealing material 20 at a corresponding position to one of the side faces of the display element layer 2. The opening 21 allows the access to the inside of the region defined by the sealing material 20. The sealing material 20 will be cured in a subsequent curing process, resulting in the sealing member 4 shown in FIGS. 6A and 6B.

As the sealing material 20, a UV-ray curing resin is preferably used; however, a thermosetting resin may be used for this purpose. In the former case, the curing of the sealing material 20 is conducted by irradiation of UV rays. In the latter case, the curing of the sealing material 20 is conducted by heating. Here, minute particle-shaped (or granular) spacers 12 have been incorporated and dispersed in the sealing material 20 in advance. However, the spacers 12 may not be incorporated in the material 20. This is because the gap 10 may be set at a predetermined value with the spacers 5 arranged in the gap 10 between the display element layer 2 and the glass substrate 6. The size or diameter of the spacers 12 is selected and determined in consideration of the thickness (or height) of the display element layer 2. The spacers 12 having the size or diameter thus determined are stirred in a predetermined period until the spacers 12 are evenly dispersed and then, used for the sealing material 20.

Next, as shown in FIGS. 9A and 9B, a predetermined quantity of spherical spacers 5 are scattered on the upper (front) surface of the display element layer 2. Thus, the spacers 5 are arranged at random on the upper surface of the display element layer 2. Due to the spacers 5 thus scattered, the gap 10 between the display element layer 2 and the glass substrate 6 can be uniformized over the whole layer 2.

Subsequently, as shown in FIGS. 10A and 10B, the glass substrate 6 is placed on the sealing material 20 and then, the glass substrate 6 is pressed to the sealing material 20 with a predetermined pressure and adhered thereto. This adhesion is carried out with the adhesive (not shown) coated on the top end of the sealing material 20, or the adhesive (not shown) coated on the area of the substrate 6 to be contact with the sealing material 20. During this adhesion step, UV rays are irradiated to the whole sealing material 20 concurrently with the adhesion, thereby curing the sealing material 20. The curing of the sealing material 20 may be carried out by heating. Due to the curing, the sealing material 20 is turned to the sealing member 4 that has a rectangular, annular plan shape and that surrounds the display element layer 2. Since the sealing material 20 has the opening 21, even if the capacity of the inner space 7 is decreased due to the pressure, the air existing in the space 7 is easily pushed out by way of the opening 21. Therefore, no problem occurs.

The above-described process steps are carried out in the atmospheric air; however, the following steps will be carried out in a vacuum atmosphere. Specifically, the structure having the configuration of FIGS. 10A and 10B is transported into the vacuum chamber (not shown) of a known vacuum generating apparatus. Thereafter, by driving the vacuum generating apparatus, the air existing in the vacuum chamber is evacuated or degassed, thereby generating a vacuum state (a reduced-pressure state) of a predetermined level in the said vacuum chamber. At this time, the air existing in the inner space 7 also is evacuated, as shown in FIGS. 11A and 11B. As a result, the air and moisture remaining in the said structure with the configuration of FIGS. 10A and 10B are removed approximately completely.

Moreover, there is a possibility that the spacers 5 exist in the area(s) of the inner space 7 other than the gap 10 after the dispersion step of the spacers 5. However, there arises no problem even if such the extra spacers 5 are in the space 7. This is because these extra spacers 5 are released to the outside along with the air in the evacuation or degassing step.

Next, nitrogen ($N_2$) gas is introduced into the above-described vacuum chamber, thereby generating a nitrogen gas atmosphere in the said chamber. The nitrogen gas pressure is gradually increased from the above-described vacuum level and finally, it is returned to the atmospheric pressure. At this time, as shown in FIGS. 12A and 12B, the nitrogen gas is gradually injected into the inner space 7 by way of the opening 11 of the sealing member 4. The injection of the nitrogen gas into the space 7 is continued until the nitrogen gas pressure in the space 7 is equal to the atmospheric pressure. In this way, the space 7 is filled with the nitrogen gas whose pressure is equal to the atmospheric pressure. At this stage, the opening 11 is not yet closed.

Next, in the nitrogen gas atmosphere thus generated, as shown in FIGS. 13A and 13B, a sheet-shaped closing material 21 is applied to the sealing member 4 to cover the opening 11 thereof from the outside using a bar-shaped supporting member 9 while the glass substrate 6 is mechanically pressed against the sealing member 4 at a predetermined pressure. The reason why the glass substrate 6 is pressed at this time is to raise the hermeticity of the closing material 21 by applying the closing material 21 in the state where the capacity or volume of the space 7 is slightly reduced. Although the sealing member 4 has been already cured at this stage, such a very small quantity of deformation as above may occur in the sealing member 4 with the pressure applied.

The closing material 21 is applied or coated to one surface of the bar-shaped supporting member 9 to have a sufficient area or size for closing the opening 11 of the sealing member 4. Therefore, it is easy for the closing material 21 to close the opening 11 by pressing the closing material 21 against the sealing member 4 with the supporting member 9. It is preferred that the same material as the sealing material 20 (i.e., a UV-curable resin or the like) is used for the closing material 21; however, any other material may be used for this purpose.

When the application of the pressure to the glass substrate 6 is stopped in the state of FIGS. 13A and 13B where the closing material 21 has been applied to the sealing member 4 to cover the opening 11, the capacity of the inner space 7 tends to return to its original one. Thus, the nitrogen gas pressure in the space 7 will be lowered slightly. As a result, a pressure difference is generated between the nitrogen gas pressure in the space 7 and the external atmospheric pressure. Due to the pressure difference thus generated, the closing material 21, which has been applied to the sealing member 4 to cover the opening 11, is slightly drawn into the space 7 and deformed. At this time, the closing material 21 is securely pressed against the outer surface of the sealing member 4 due to the pressure difference and therefore, the opening 11 can be sealed by the closing material 21 with reliability. The drawn-in and deformation of the closing material 21 will stop in the state where the nitrogen gas pressure in the space 7 is equal to the atmospheric pressure outside the space 7. According to the inventor's research, it is preferred that the quantities of the drawn-in and deformation of the closing material 21 are set at approximately several millimeters (mm), respectively.

After confirming that the drawn-in and deformation of the closing material 21 are completed as desired, UV rays are irradiated to the closing material 21 (or, heated) to cure the same. As a result, the closing material 21 is turned to the closing member 8. The state at this stage is shown in FIGS. 14A and 14B. After the curing of the closing material 21 is finished, the supporting member 9 is departed from the closing member 8. Since the closing material 21 has already been cured and attached to the sealing member 4, this departure operation is easily carried out. In this way, the electrophoretic display device 50 having the closed inner space 7 filled with the nitrogen gas at a pressure equal to the atmospheric pressure as shown in FIGS. 6A and 6B is fabricated.

With the method of fabricating the electrophoretic display device 50 according to the first embodiment of the invention, as explained above, when generating the vacuum state of the predetermined level by evacuating the air existing in the vacuum chamber of the vacuum generating apparatus in the step of FIGS. 11A and 11B, the air and moisture remaining in the structure with the configuration of FIGS. 10A and 10B (in other words, the very small quantity of air and moisture remaining in the inner space 7) are removed approximately completely. Thus, the display defects caused by the said air and moisture are prevented. Therefore, in corporation with the fact that the electrophoretic display element layer 2 is uniformly pressed to the TFT substrate 1 with the glass substrate 6 by way of the spacers 5, and the fact that the gap 10 between the glass substrate 6 and the display element layer 2 is kept uniform by the spacers 5 (in other words, the strength of the electric field applied to the display element layer 2 is uniformized), higher image quality than the above-described prior-art electrophoretic display device 150 is obtained.

Moreover, with this method, when filing the inner space 7 with nitrogen gas, the glass substrate 6 is pressed in the nitrogen gas atmosphere. Then, in the same nitrogen gas atmosphere, the closing material 21 is applied to the sealing member 4 to cover the opening 11 and thereafter, the pressing operation to the glass substrate 6 is stopped, thereby pressing securely the closing material 21 to the outer surface of the sealing member 4 by utilizing the pressure difference between the nitrogen gas pressure in the space 7 and the atmospheric pressure in the outside. Therefore, the opening 11 can be sealed by the closing material 21 with reliability. In other words, the hermeticity of the closing material 21 can be improved. Accordingly, the moisture and/or air existing outside (i.e., existing in the atmospheric air) will not enter the space 7 during the use or operation of the electrophoretic display device 50. As a result, higher reliability than the above-described prior-art electrophoretic display device 150 is obtainable also simultaneously with the higher image quality.

Second Embodiment

FIG. 15A is a plan view showing the schematic structure of an electrophoretic display device 50A according a second embodiment of the invention. FIG. 15B is a cross-sectional view along the line XVB-XVB in FIG. 15A.

The basic structure of the electrophoretic display device 50A according the second embodiment shown of FIGS. 15A and 15B are approximately the same as that of the electrophoretic display device 50 according the first embodiment of FIGS. 6A and 6B. However, the device 50A is different from the device 50 in that a sealing member 4a is formed to be continuous and does not have the opening 11 and the closing member 8 and that the spacers 5 are not arranged in the gap 10.

As shown in FIGS. 15A and 15B, the electrophoretic display device 50A of the second embodiment comprises a TFT substrate 1, a bistable electrophoretic display element layer 2 fixed on the predetermined display region of the TFT substrate 1, an annular sealing member 4a formed on the TFT substrate 1 to surround the electrophoretic display element layer 2, and a transparent glass substrate 6 fixed on the opposite end of the sealing member 4a to the TFT substrate 1. The TFT substrate 1 has TFTs and predetermined driving electrodes (both not shown) arranged in a matrix array in the display region. The sealing member 4a is thicker or higher than the display element layer 2. The glass substrate 6 has a wider area than that of the display element layer 2. The display element layer 2 is fixed to the TFT substrate 1 with a sheet-shaped adhesive 3 coated on the back surface (i.e., the main surface on the same side as the TFT substrate 1) of the display element layer 2. These points are the same as the first embodiment.

Each of the TFT substrate 1, the display element layer 2, and the glass substrate 6 has an approximately rectangular plan shape. The display element layer 2 is smaller in area than the TFT substrate 1. The glass substrate 6 is smaller in area than the TFT substrate 1 but larger in area than the display element layer 2. The sealing member 4a, which is extended linearly along the outer side faces of the display element layer 2, has a rectangular ring-shaped plan shape whose corners are rounded. This point is the same as the first embodiment. However, unlike the first embodiment, the sealing member 4a is formed to be continuous and does not have the opening 11 in the first embodiment. Spacers 12 are incorporated and dispersed in the sealing member 4a, which is the same as the first embodiment.

The TFT and glass substrates 1 and 6 and the sealing member 4a interconnecting the substrates 1 and 6 constitute a closed inner space 7, in which the display element layer 2 is placed. In the space 7, the display element layer 2 is apart from the sealing member 4a and the glass substrate 6. Since the height of the sealing member 4a is set to be greater than that of the display element layer 2, the glass substrate 6 fixed to the top end of the member 4a (i.e., the opposite end to the TFT substrate 1) and the display element layer 2 positioned below the glass substrate 6 are apart from each other. For this reason, a gap 10 is generated between the upper main surface of the display element layer 2 and the lower main surface (i.e., the inner surface) of the glass substrate 6. These points are the same as the first embodiment.

However, unlike the first embodiment, the spacers 5 used in the first embodiment are not included in the gap 10. Thus, only the peripheral part of the glass plate 6 is mechanically supported by the sealing member 4a, and the middle part thereof, which is above the display element layer 2, is not mechanically supported by the display element layer 2. The desired magnitude of the gap 10 is determined by the thickness or height of the sealing member 4a. Even if only the peripheral part of the glass plate 6 is mechanically supported by the sealing member 4a in this way, there arises no problem in the mechanical strength because of the inner space 7 being filled with nitrogen gas having a pressure equal to the atmospheric pressure and the rigidity of the glass substrate 6. Moreover, although the spacers 5 are not provided, the gap 10 between the display element layer 2 and the glass substrate 6 can be set approximately uniform over the whole surface of the said layer 2. In addition, since the glass substrate 6 is apart from the display element layer 2, there is an advantage that the display element layer 2 is not affected by the shock or the like applied to the glass substrate 6.

The desired thickness or height of the sealing member 4a can be easily realized by setting appropriately the particle size (diameter) and the content (quantity) of the spacers 12 incorporated and dispersed in the member 4a.

As described above, the electrophoretic display device 50A according to the second embodiment comprises the TFT substrate 1 (the first substrate) having the TFTs as switching elements and the driving electrodes, the electrophoretic display element layer 2 fixed in the predetermined display region of the TFT substrate 1, the annular sealing member 4a that surrounds the display element layer 2 on the TFT substrate 1 and that is formed to be thicker or higher than the said layer 2, and the glass substrate 6 (the second substrate) that has a wider area than the display element layer 2 and that is fixed on the opposite end of the sealing member 4s to the TFT substrate 1. The TFT substrate 1, the sealing member 4a, and the glass substrate 6 constitute the closed inner space 7 around the display element layer 2, thereby enclosing the display element layer 2 in the space 7. The space 7 is filled with the nitrogen gas having a pressure equal to the atmospheric pressure.

The electrophoretic display device 50A is fabricated in the nitrogen gas atmosphere whose pressure is equalized to the atmospheric pressure in order to fill the closed inner space 7 (which does not have the opening 11) with nitrogen gas. Therefore, the first display defect (i.e., blotches or smears on the display screen), which is caused by the entering of a very small quantity of moisture and/or air bubbles existing in the vicinity of the electrophoretic display element layer 2 to the inside of the said layer 2 during the fabrication process sequence, and the second display defect (i.e., defective driving), which is caused by the entering of the said moisture and/or air bubbles to the boundary between the TFT substrate 1 and the display element layer 2, can be prevented with reliability.

Moreover, since the first and second display defects are reliably prevented, higher display quality than the above-described prior-art electrophoretic display device 150 is obtained.

Furthermore, the display element layer 2 is enclosed in the sealed inner space 7, which is filled with nitrogen gas whose pressure is equal to the atmospheric pressure. Thus, the moisture and air existing outside (i.e., in the atmospheric air) will not enter the space 7 during the use of the electrophoretic display device 50A according to the second embodiment. As a result, higher reliability than the above-described prior-art electrophoretic display device 150 is obtainable simultaneously.

Next, a method of fabricating the electrophoretic display device 50A according to the second embodiment is explained below with reference to FIGS. 16A and 16B to FIGS. 19A and 19B.

First, as shown in FIGS. 16A and 16B, the display element layer 2 having the adhesive 3 on its back surface is heated to a predetermined temperature in a nitrogen atmosphere, softening the said adhesive 3. Then, the display element layer 2 is placed on the display region of the TFT substrate 1 while conducting the positional alignment of the said layer 2 and pressed thereon. In this way, the display element layer 2 is adhered and fixed to the display region of the TFT substrate 1. Thereafter, a predetermined bubble elimination process is carried out, thereby eliminating the bubbles remaining between the display element layer 2 and the TFT substrate 1.

Next, as shown in FIGS. 17A and 17B, by using a known dispenser or by a printing method, a sealing material 20a is formed to be continuously belt-shaped in the nitrogen atmosphere, thereby surrounding the entire periphery of the display element layer 2. The sealing material 20a does not have the opening 21 of the sealing material 20 in the first embodiment. The sealing material 20a will be cured in a subsequent step, resulting in the sealing member 4a shown in FIGS. 15A and 15B.

As the sealing material 20a, a UV-ray curing resin is preferably used; however, a thermosetting resin may be used for this purpose. In the former case, the curing of the sealing material 20a is conducted by irradiation of UV rays. In the latter case, the curing of the sealing material 20a is conducted by heating. Minute particle-shaped (or granular) spacers 12 have been incorporated and dispersed in the sealing material 20a in advance. Although the spacers 12 may not be incorporated in the material 20a, it is preferred that the spacers 12 are incorporated in the material 20a because the spacers 5 are not arranged in the gap 10.

Subsequently, as shown in FIGS. 18A and 18B, the glass substrate 6 is placed on the sealing material 20a in the nitrogen gas atmosphere. Then, the glass substrate 6 is mechanically pressed to the sealing material 20a with a predetermined pressure and adhered thereto, as shown in FIGS. 19A and 19B. This adhesion is carried out with the adhesive coated on the top end of the material 20a, or the adhesive coated on the area of the substrate 6 to be contact with the material 20a. During this adhesion step, UV rays are irradiated to the entire material 20a concurrently with the adhesion, thereby curing the material 20a. The curing of the material 20a may be carried out by heating. As a result, the sealing material 20a is turned to the sealing member 4a that has a rectangular, annular plan shape and that surrounds the display element layer 2.

The above-described process steps are conducted in the nitrogen gas atmosphere whose pressure is equalized to the atmospheric pressure. Therefore, when the closed inner space 7 is formed by placing the glass substrate 6 on the sealing material 20a and sealing the same, the space 7 is automatically filled with a nitrogen gas having a pressure equal to the atmospheric pressure.

Thus, the electrophoretic display device 50A according to the second embodiment is fabricated.

In this way, with the above-described method of fabricating the electrophoretic display device 50A according to the second embodiment, unlike the first embodiment, the process of evacuating the remaining air and moisture (i.e., a very small quantity of the moisture and bubbles remaining in the inner space 7) is not included. However, all the process steps are carried out in the nitrogen atmosphere and therefore, the said moisture and bubbles are prevented from remaining in the space 7 in the fabrication process sequence. As a result, the display defect induced by the said moisture and bubbles is prevented. This means that higher image quality than the above-described prior-art electrophoretic display device 150 is obtained.

Moreover, the sealing material 4a is continuous and does not have an opening, and the inner space 7 is filled with nitrogen gas. Thus, the moisture and/or air existing outside (i.e., existing in the atmospheric air) will not enter the space 7 during the use or operation of the electrophoretic display device 50A. As a result, higher reliability than the above-described prior-art electrophoretic display device 150 is obtainable also simultaneously with the higher image quality.

Furthermore, since the process of closing the opening of the sealing material 20a is unnecessary, the count of the required fabrication process steps is decreased, resulting in an advantage that the fabrication cost is lowered.

In addition, although the count of the required fabrication process steps is increased, the spacers 5 may be dispersed in the gap 10 like the first embodiment to improve the uniformity of the gap 10 and the adhesion of the display element layer 2 to the TFT substrate 1.

Third Embodiment

FIG. 20A is a plan view showing the schematic structure of an electrophoretic display device 50B according a third embodiment of the invention. FIG. 20B is a cross-sectional view along the line XXB-XXB in FIG. 20A.

The structure of the electrophoretic display device 50B according the third embodiment of FIGS. 20A and 20B is the same as that of the electrophoretic display device 50 according the first embodiment of FIGS. 6A and 6B, except that the inner space 7 is kept in a "vacuum state (reduced pressure state)" of a predetermined level instead of being filled with nitrogen gas. Therefore, explanation about the structure of the device 50B is omitted here by attaching the same reference numerals as used in the device 50 of the first embodiment to the same elements.

Next, a method of fabricating the electrophoretic display device 50B according to the third embodiment is explained below with reference to FIGS. 21A and 21B to FIGS. 27A and 27B. This fabrication method is different from that of the first embodiment in that the process step of adhering the glass substrate 6 to a sealing member 6b and the subsequent process steps thereof are carried out in a vacuum atmosphere to keep the inner space 7 at a predetermined vacuum level First, as shown in FIGS. 21A and 21B, the display element layer 2 having the adhesive 3 on its back surface is heated to a predetermined temperature in the atmospheric air, softening the said adhesive 3. Then, the display element layer 2 is placed on the display region of the TFT substrate 1 while conducting the positional alignment of the said layer 2 and pressed thereon. In this way, the display element layer 2 is adhered and fixed to the display region of the TFT substrate 1. Thereafter, a predetermined bubble elimination process is carried out, thereby eliminating the bubbles remaining between the display element layer 2 and the TFT substrate 1.

Next, as shown in FIGS. 22A and 22B, by using a known dispenser or by a printing method, the sealing material 20b is formed to be belt-shaped to surround the display element layer 2. In this step, an opening or window 21b is formed to penetrate through the sealing material 20b at a corresponding position to one of the side faces of the display element layer 2. The opening 21b allows the access to the inside of the area defined by the sealing material 20b. The sealing material 20b will be turned to the sealing member 4b shown in FIGS. 20A and 20B after a subsequent curing process of the material 20b.

As the sealing material 20b, a UV-ray curing resin is preferably used; however, a thermosetting resin may be used for this purpose. In the former case, the curing of the sealing material 20b is conducted by irradiation of UV rays. In the latter case, the curing of the sealing material 20b is conducted by heating. Minute particle-shaped (or granular) spacers 12 have been incorporated and dispersed in the sealing material 20b in advance. However, the spacers 12 may not be incorporated in the material 20b. This is because the gap 10 can be set at a predetermined value with the spacers 5 arranged in the gap 10 between the display element layer 2 and the glass substrate 6.

Next, as shown in FIGS. 23A and 23B, a predetermined quantity of spherical spacers 5 are scattered on the upper surface of the display element layer 2. Thus, the spacers 5 are arranged at random on the upper surface of the said layer 2. Due to the spacers 5, the gap 10 between the display element layer 2 and the glass substrate 6 can be uniformized over the whole layer 2, and the adhesion of the layer 2 to the TFT substrate 1 can be improved.

The above-described process steps are conducted in the atmospheric. Thereafter, the structure having the configuration of FIGS. 23A and 23B is transported to the vacuum chamber (not shown) of a known vacuum generating apparatus and then, the glass substrate 6 is placed on the sealing material 20b. Then, as shown in FIGS. 24A and 24B, the air existing in the vacuum chamber is evacuated or degassed by operating the vacuum generating apparatus, thereby generating a vacuum state of a predetermined level in the said chamber. As a result, the air and moisture existing in the space 7 are removed or degassed by way of the opening 21b and at the same time, the air and moisture remaining in the said structure with the configuration of FIGS. 24A and 24B are removed.

After the degassing process is completed, in the vacuum atmosphere thus generated, the glass substrate 6 is pressed to the sealing material 20b and adhered thereto, as shown in FIGS. 25A and 25B. This adhesion is carried out with the adhesive (not shown) coated on the top end of the material 20b, or the adhesive (not shown) coated on the area of the substrate 6 to be contact with the material 20b. During this adhesion step, UV rays are irradiated to the whole material 20b concurrently with the adhesion, thereby curing the material 20b. The curing of the material 20b may be carried out by heating. Due to the curing, the sealing material 20b is turned to the sealing member 4b that has a rectangular, annular plan shape and that surrounds the display element layer 2.

Next, in the same vacuum atmosphere, as shown in FIGS. 26A and 26B, a closing material 21 is applied to the sealing member 4b to cover the opening 11b thereof from the outside. Since the closing material 21 has been applied to one surface of a bar-shaped supporting member 9 to have a sufficient area or size for closing the opening 11b, it is easy for the closing material 21 to close the opening 11b by pressing the closing material 21 against the sealing member 4b with the supporting member 9. It is preferred that the same material as the sealing material 20b is used for the closing material 21.

The air is gradually introduced into the vacuum chamber while keeping the closing material 21 applied to the sealing member 4b to cover the opening 11b, thereby returning the above-described vacuum state to the atmospheric pressure. As a result, the closing material 21, which has been applied to the sealing member 4b to cover the opening 11b, is slightly drawn into the space 7 and deformed. At this time, the closing material 21 is securely pressed against the outer surface of the sealing member 4b due to the pressure difference and therefore, the opening 11b can be sealed by the closing material 21 with reliability. It is preferred that the quantities of the drawn-in and deformation of the closing material 21 are set at approximately several millimeters (mm), respectively. The vacuum pressure (reduced pressure) in the space 7 is appropriately adjusted such that the closing material 21 has a desired deformation quantity.

After confirming that the drawn-in and deformation of the closing material 21 are completed, UV rays are irradiated to the closing material 21 (or, heated) to cure the same. As a result, the closing material 21 is turned to the closing member 8. The state at this stage is shown in FIGS. 27A and 27B. After the curing process of the closing material 21 is finished, the supporting member 9 is departed from the closing member 8. Since the closing material 21 has already been cured, this departure operation is easily carried out. In this way, the electrophoretic display device 50B having the closed inner space 7 the inside of which is set in a vacuum state as shown in FIGS. 20A and 20B is fabricated.

With the method of fabricating the electrophoretic display device 50B according to the third embodiment of the invention, as explained above, when generating the vacuum state of the predetermined level by evacuating the air existing in the vacuum chamber of the vacuum generating apparatus in the step of FIGS. 24A and 24B, the air and moisture remaining in the structure with the configuration of FIGS. 23A and 23B (in other words, the very small quantity of air and moisture remaining in the inner space 7) are removed completely. Thus, the display defects caused by the said air and moisture is prevented. Therefore, in corporation with the fact that the electrophoretic display element layer 2 is uniformly pressed to the TFT substrate 1 with the glass substrate 6 by way of the spacers 5, and the fact that the gap 10 between the glass substrate 6 and the display element layer 2 is kept uniform by the spacers 5 (in other words, the strength of the electric field applied to the display element layer 2 is uniformized), higher image quality than the above-described prior-art electrophoretic display device 150 is obtained.

Moreover, when setting the inner space 7 at the predetermined vacuum level, the glass substrate 6 is pressed in the vacuum state. Then, in this state, the closing material 21b is applied to the sealing member 4b to cover the opening 11b thereof and thereafter, the inside of the space 7 is returned to the atmospheric pressure, thereby pressing securely the closing material 21b to the outer surface of the sealing member 4b by utilizing the pressure difference between the vacuum pressure in the space 7 and the atmospheric pressure on the outside. Therefore, the opening 11b can be sealed by the closing material 21b with reliability. In other words, the hermeticity of the closing material 21b can be improved. Accordingly, the moisture and/or air existing outside (i.e., existing in the atmospheric air) will not enter the space 7 during the use or operation of the electrophoretic display device 50B. As a result, higher reliability than the above-described prior-art electrophoretic display device 150 is obtainable simultaneously with the higher image quality.

Other Embodiments

The above-described first to third embodiments are concrete examples of the present invention. Therefore, needless to say, the present invention is not limited to these embodiments and any modification is applicable to them.

For example, although a microcapsule type electrophoretic display element layer is used as the electrophoretic display element layer 2 in the above-described first to third embodiments, the invention is not limited to this. Any other type of the electrophoretic display element layer may be used if it is a display element layer including electrophoretic display elements.

Moreover, in the above-described first to third embodiments, the gap 10 is formed between the glass substrate 6 and the electrophoretic display element layer 2; however, the invention is not limited to this. The glass substrate 6 and the electrophoretic display element layer 2 may be contacted with each other. In this case, the display element layer 2 is directly pressed to the TFT substrate 1 by the glass substrate 6.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. An electrophoretic display device, comprising:
a first substrate comprising switching elements and driving electrodes;
an electrophoretic display element layer fixed on a predetermined display region of the first substrate;
a sealing member formed to surround the display element layer on the first substrate, the sealing member being thicker than the display element layer; and
a second substrate fixed on an opposite end of the sealing member to the first substrate, the second substrate having a wider area than the display element layer,
wherein the first substrate, the sealing member, and the second substrate form a closed inner space around the display element layer, thereby enclosing the display element layer in the space,
wherein the space is filled with an inert gas having a pressure approximately equal to an atmospheric pressure or is set in a predetermined vacuum state,
wherein the sealing member comprises an opening that allows an access to the electrophoretic display element layer enclosed in the space, the opening being closed by a closing member, and
wherein a part of the closing member is drawn in the space by way of the opening.

2. An electrophoretic display device, comprising:
a first substrate comprising switching elements and driving electrodes;
an electrophoretic display element layer fixed on a predetermined display region of the first substrate;
a sealing member formed to surround the display element layer on the first substrate, the sealing member being thicker than the display element layer; and
a second substrate fixed on an opposite end of the sealing member to the first substrate, the second substrate having a wider area than the display element layer,
wherein the first substrate, the sealing member, and the second substrate form a closed inner space around the display element layer, thereby enclosing the display element layer in the space,
wherein the space is filled with an inert gas having a pressure approximately equal to an atmospheric pressure or is set in a predetermined vacuum state,
wherein the sealing member comprises an opening that allows an access to the electrophoretic display element layer enclosed in the space, the opening being closed by a closing member, and
wherein the closing member for closing the opening comprises a same material as the sealing member.

3. A method of fabricating an electrophoretic display device, said method comprising:
preparing a first substrate comprising switching elements and driving electrodes;
fixing an electrophoretic display element layer on a predetermined display region of the first substrate;
forming, on the first substrate, a sealing member that surrounds the display element layer and that is thicker than the display element layer;
fixing a second substrate having a wider area than the display element layer on an opposite end of the sealing member to the first substrate to form a closed inner space by the first substrate, the sealing member, and the second substrate around the display element layer, thereby enclosing the display element layer in the space; and
filling the space with an inert gas having a pressure approximately equal to an atmospheric pressure or setting a predetermined vacuum state in the space,
wherein in said forming the sealing member, an opening is formed that allows an access to the electrophoretic display element layer enclosed in the space, and thereafter the opening is closed by a closing member, and
wherein, when the opening is closed by the closing member a closing material is applied to the sealing member to cover the opening from an outside and thereafter, the opening is closed by the closing member by a pressure difference between an inside and an outside of the inner space.

4. The method according to claim 3, wherein the closing member for closing the opening comprises a same material as the sealing member.

* * * * *